(12) United States Patent
Wang et al.

(10) Patent No.: US 10,048,025 B2
(45) Date of Patent: Aug. 14, 2018

(54) CAPACITY MODULATING AN EXPANSION DEVICE OF A HVAC SYSTEM

(71) Applicant: TRANE INTERNATIONAL INC., Piscataway, NJ (US)

(72) Inventors: Jun Wang, Clarksville, TN (US); Roger Voorhis, Clarksville, TN (US); Robert Fredrick Schult, Clarksville, TN (US); Justin Slade Winters, Adams, TN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 173 days.

(21) Appl. No.: 14/763,456

(22) PCT Filed: Jan. 24, 2014

(86) PCT No.: PCT/US2014/013043
§ 371 (c)(1),
(2) Date: Jul. 24, 2015

(87) PCT Pub. No.: WO2014/117017
PCT Pub. Date: Jul. 31, 2014

(65) Prior Publication Data
US 2015/0362263 A1    Dec. 17, 2015

Related U.S. Application Data

(60) Provisional application No. 61/756,660, filed on Jan. 25, 2013.

(51) Int. Cl.
*F25B 39/02* (2006.01)
*F28F 13/06* (2006.01)
(Continued)

(52) U.S. Cl.
CPC ............ *F28F 13/06* (2013.01); *F25B 39/028* (2013.01); *F25B 41/062* (2013.01); *F25B 49/02* (2013.01);
(Continued)

(58) Field of Classification Search
CPC .............. F25B 39/028; F25B 2341/066; F25B 2341/0661
(Continued)

(56) References Cited

U.S. PATENT DOCUMENTS 2,833,121 A    5/1958   Dorf
3,370,438 A    2/1968   Hopkinson
(Continued)

FOREIGN PATENT DOCUMENTS

CN    101033805 A    9/2007
CN    201277766 Y    7/2009
(Continued)

OTHER PUBLICATIONS

International Search Report and Written Opinion for International Application No. PCT/US2014/013043, dated Jun. 2, 2014, 12 pgs.

*Primary Examiner* — Allen Flanigan
(74) *Attorney, Agent, or Firm* — Hamre, Schumann, Mueller & Larson, P.C.

(57) ABSTRACT

Methods, systems and apparatuses are directed to a capacity modulating assembly configured to distribute two-phase refrigerant mixture to an evaporator of a HVAC system, such as a micro-channel heat exchanger (MCHEX) evaporator. The capacity modulating assembly may include a plurality of expansion devices. During capacity modulation, at least one of the plurality of expansion devices can be closed so that a refrigerant flow rate through the remaining expansion devices can be maintained. The capacity modulating assembly can include a refrigerant outflow port, which may help (Continued)

direct refrigerant out of the heat exchanger. The capacity modulating assembly can be connected with the MCHEX. The plurality of expansion devices can be configured to extend inside a header of the MCHEX to help distribute refrigerant to the micro-channel tubes of the MCHEX.

8 Claims, 15 Drawing Sheets

(51) Int. Cl.
  *F25B 41/06* (2006.01)
  *F25B 49/02* (2006.01)
  *F28F 9/02* (2006.01)
  *F28F 27/02* (2006.01)
  *F28D 1/053* (2006.01)
  *F25B 13/00* (2006.01)

(52) U.S. Cl.
  CPC ........ *F28D 1/05391* (2013.01); *F28F 9/0273* (2013.01); *F28F 27/02* (2013.01); *F25B 13/00* (2013.01); *F25B 2341/0661* (2013.01); *F25B 2600/2513* (2013.01); *F25B 2600/2519* (2013.01)

(58) Field of Classification Search
  USPC ...... 62/324.1, 324.6, 511, 525; 165/96, 100, 165/101, 174
  See application file for complete search history.

(56) References Cited

U.S. PATENT DOCUMENTS

| | | |
|---|---|---|
| 3,487,642 A | 1/1970 | Norton |
| 3,643,462 A | 2/1972 | Eberhart |
| 3,866,439 A | 2/1975 | Bussjager et al. |
| 3,977,205 A | 8/1976 | Dreisziger et al. |
| 4,050,506 A | 9/1977 | Small |
| 4,149,390 A | 4/1979 | Iijima et al. |
| 4,430,866 A | 2/1984 | Willitts |
| 4,679,411 A | 7/1987 | Pearse, Jr. |
| 5,101,640 A | 4/1992 | Fukushima et al. |
| 5,704,221 A * | 1/1998 | Lego ................ F25B 5/02 62/276 |
| 5,862,676 A | 1/1999 | Kim et al. |
| 5,901,785 A * | 5/1999 | Chiba et al. .......... F28D 1/0341 165/153 |
| 5,910,167 A * | 6/1999 | Reinke et al. ........ F25B 39/028 165/174 |
| 6,381,974 B1 * | 5/2002 | Hwang et al. .......... F25B 13/00 165/286 |
| 6,751,974 B1 | 6/2004 | Wiggs |
| 7,490,662 B2 | 2/2009 | Eliades et al. |
| 7,559,207 B2 | 7/2009 | Knight et al. |
| 7,845,185 B2 | 12/2010 | Knight et al. |
| 8,011,200 B2 | 9/2011 | Spearing |
| 8,101,293 B2 | 1/2012 | Chan et al. |
| 8,113,270 B2 | 2/2012 | Rios et al. |
| 8,689,582 B2 * | 4/2014 | Birkelund et al. .... F25B 39/028 62/524 |
| 2002/0021742 A1 | 2/2002 | Maskell et al. |
| 2004/0089020 A1* | 5/2004 | Hong et al. ........... F24F 1/0059 62/525 |
| 2006/0054312 A1 | 3/2006 | Kim et al. |
| 2006/0150667 A1 | 7/2006 | Lee et al. |
| 2008/0093051 A1 | 4/2008 | Rios et al. |
| 2008/0296005 A1* | 12/2008 | Taras et al. ............. F25B 13/00 165/173 |
| 2011/0056667 A1 | 3/2011 | Taras et al. |
| 2011/0094257 A1 | 4/2011 | Rusignuolo et al. |
| 2011/0127015 A1 | 6/2011 | Taras et al. |

FOREIGN PATENT DOCUMENTS

| | | |
|---|---|---|
| CN | 202092385 U | 12/2011 |
| JP | 06-323691 | 11/1994 |
| JP | 2000179987 A | 6/2000 |
| JP | 2001-091099 | 4/2001 |
| KR | 10-1998-068338 | 10/1998 |

* cited by examiner

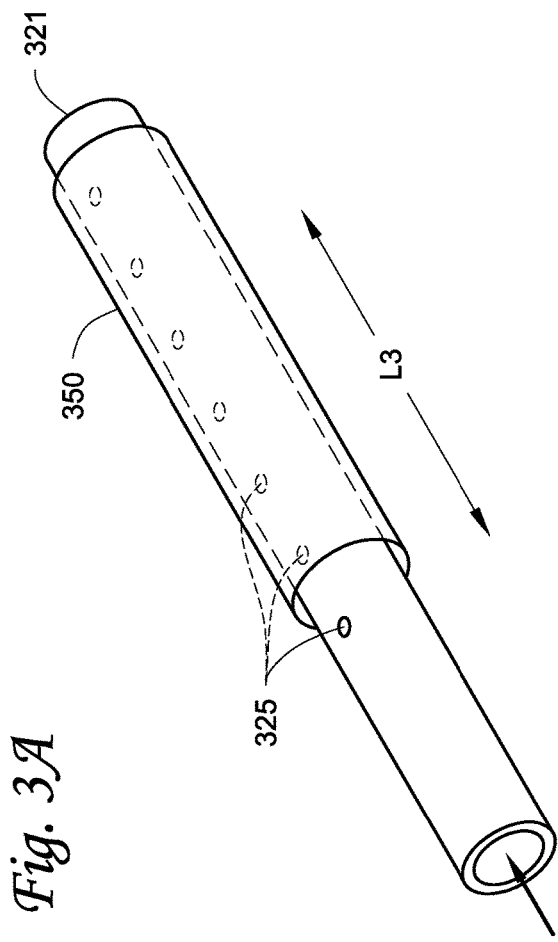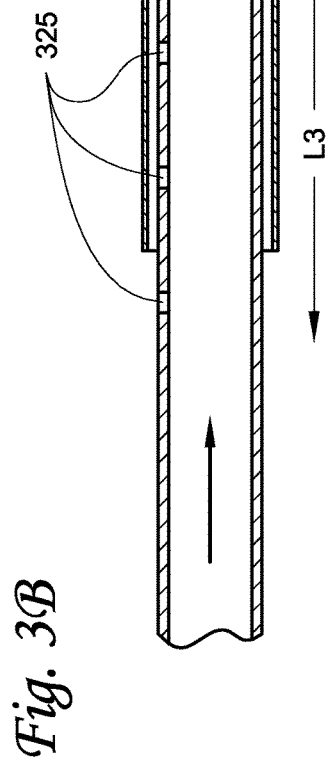
Fig. 3A
Fig. 3B

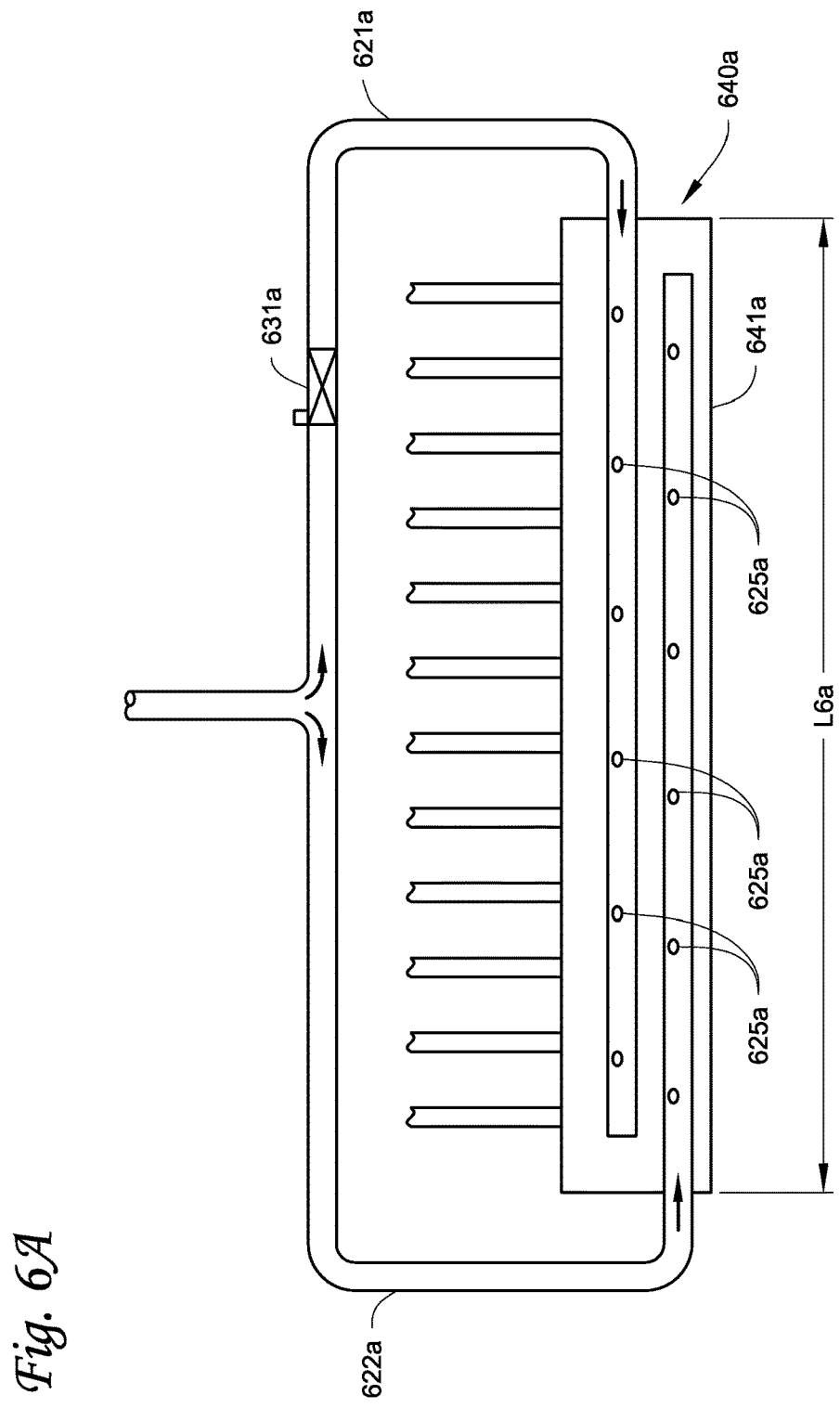

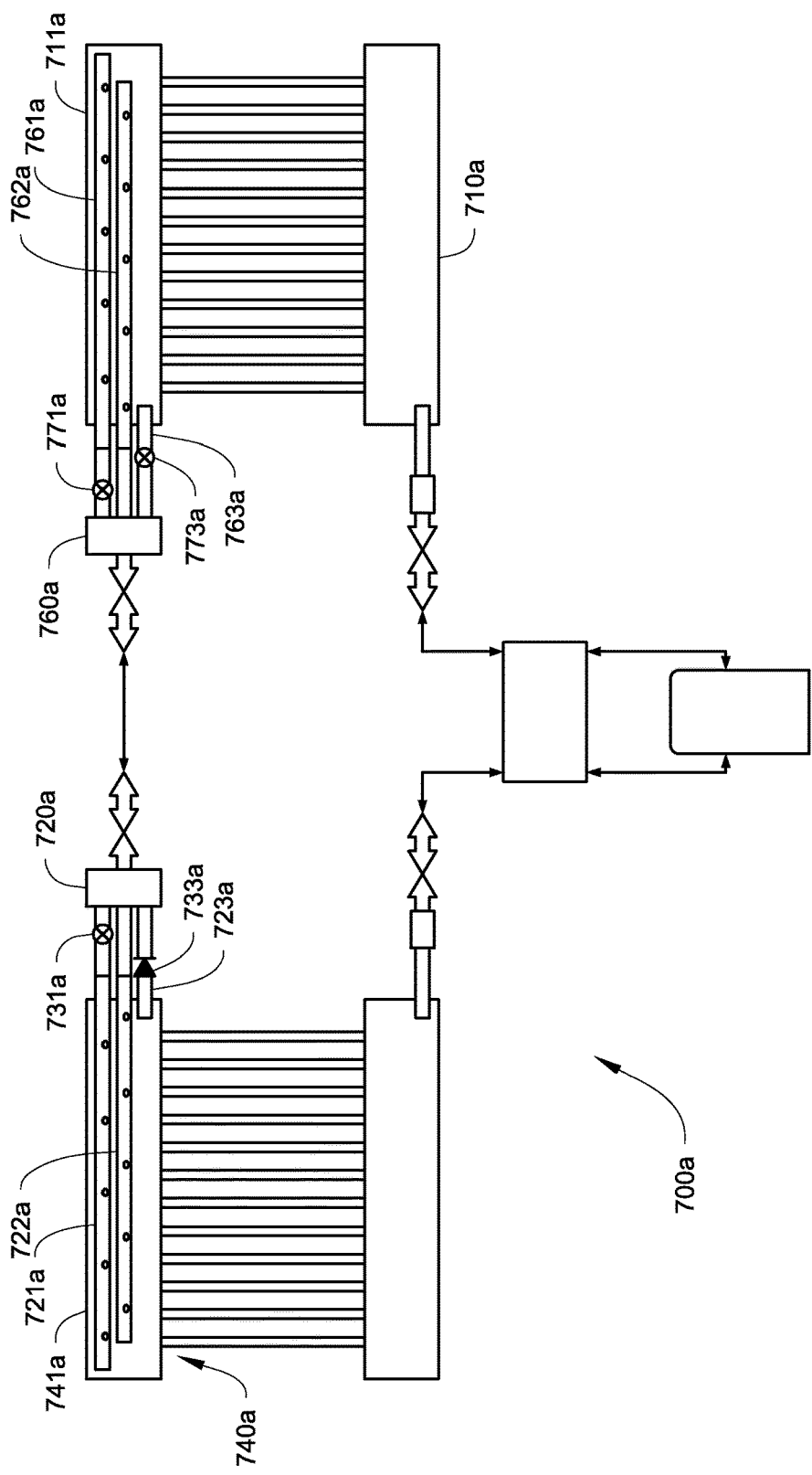

CAPACITY MODULATING AN EXPANSION DEVICE OF A HVAC SYSTEM

FIELD OF TECHNOLOGY

Embodiments disclosed herein relate generally to an expansion device of, for example, a heating, ventilation and air conditioning (HVAC) system. More specifically, embodiments disclosed herein relate generally to methods, systems and apparatuses that are directed to modulating, for example, a capacity of an expansion device in a HVAC system, which may be used with a heat exchanger (e.g. a micro-channel heat exchanger (MCHEX)) of a HVAC system.

BACKGROUND

A HVAC system typically includes a compressor, a condenser, an expansion device and an evaporator, forming a refrigeration circuit. In a cooling cycle, refrigerant vapor is generally compressed by the compressor, and then condensed to liquid refrigerant in the condenser. The liquid refrigerant can then be directed through the expansion device to reduce a temperature and become a liquid/vapor refrigerant mixture (two-phase refrigerant mixture). The two-phase refrigerant mixture can be directed into the evaporator to exchange heat with, for example, air moving across the evaporator. The two-phase refrigerant mixture can be vaporized to refrigerant vapor in the evaporator.

Some HVAC systems may be able to operate in a heating cycle. These HVAC systems are typically called heat pumps. During a heating cycle, the process is generally reversed from the process in the cooling cycle. In the heating cycle, the evaporator in the cooling cycle functions as a condenser, and the condenser functions as an evaporator. After being compressed by the compressor, the compressed refrigerant vapor is typically directed to the evaporator first so as to release heat to, for example, the indoor air, which also condenses the refrigerant vapor to liquid refrigerant. The liquid refrigerant is then typically directed to the condenser through an expansion device to become a two-phase refrigerant mixture.

The evaporator and the condenser are heat exchangers. Heat exchangers are typically configured to help establish a heat exchange relationship between a first fluid (such as refrigerant and a process fluid) and a second fluid (such as air). Various types of heat exchangers have been developed to work as a condenser and/or an evaporator. One type of heat exchanger is a micro-channel heat exchanger (MCHEX). A typical MCHEX may include micro-channel tubes running in parallel between two headers. The adjacent tubes generally have fan-fold fins brazed therein between. The micro-channel tubes form fluid communication with the headers. Refrigerant can be distributed into the micro-channel tubes from the headers, and/or collected in the headers when the refrigerant flows out of the micro-channel tubes. Outer surfaces of the micro-channel tubes and the fins may help heat exchange between the first fluid (such as refrigerant) in the micro-channel tubes and a second fluid (such as air) flowing across the outer surfaces of the micro-channel tubes.

SUMMARY

Methods, systems and apparatuses described herein are directed to a capacity modulating assembly that can be configured to expand liquid refrigerant to, for example, a two-phase refrigerant mixture in a HVAC system, while modulating, for example, a capacity of the capacity modulating assembly. Generally, embodiments of the capacity modulating assembly may include a plurality of expansion devices. Some of the plurality of expansion devices may be connected to a flow control device for controlling a refrigerant flow into the connected expansion device. The flow control device can be closed to prevent refrigerant from flowing into the connected expansion device. The capacity modulation of the capacity modulating assembly can be performed by opening or closing the flow control device. Embodiments of the capacity modulating assembly configured to work with a MCHEX are also described herein. Embodiments of HVAC systems that incorporate a MCHEX equipped with the capacity modulating assembly are also provided herein. The capacity modulating assembly can also be configured to work with other types of heat exchangers, such as a plate and fin type heat exchanger or a finned-tube heat exchanger.

In some embodiments, the capacity modulating assembly may include a plurality of expansion devices. In some embodiments, each of the plurality of expansion devices of the capacity modulating assembly may include at least one orifice. In some embodiments, the expansion device can be connected to a flow control device that has an open state and a closed state. The closed state may be configured to restrict refrigerant from flowing to the expansion device, and the open state is configured to allow refrigerant to flow to the expansion device.

In some embodiments, the flow control device of the capacity modulating assembly may be a solenoid valve.

In some embodiments, the capacity modulating assembly may include a refrigerant outflow port and an outflow control device that is connected to the refrigerant outflow port. The refrigerant outflow port may allow refrigerant to flow out of a heat exchanger that is connected to the outflow port relatively quickly in, for example, a heating cycle. In some embodiments, the outflow control device can have an open state and a closed state, where the open state is configured to allow refrigerant to flow through the refrigerant outflow port relatively quickly, and the closed state is configured to restrict (or prevent) refrigerant from flowing through the refrigerant outflow port. In some embodiments, the outflow control device can be a check valve or a solenoid valve.

In some embodiments, the capacity modulating assembly can be connected to a header of a micro-channel heat exchanger. In some embodiments, the plurality of expansion devices of the capacity modulating assembly may be configured to extend in a longitudinal direction inside the header.

In some embodiments, a capacity modulating assembly may include an expansion device that includes a plurality of orifices; and a slidable sleeve slideably disposed on the expansion device. In some embodiments, the slidable sleeve may be configured so that when the slidable sleeve slides on the expansion device, various numbers of the orifices can be covered by the slidable sleeve.

In some embodiments, a method of modulating a capacity of a heat exchanger may include: providing a plurality of orifices; opening all of the plurality of orifices, when the heat exchanger is operated at a full load condition; and closing at least one of the plurality of orifices, when the heat exchanger is operated at a partial load condition.

In some embodiments, a heat exchanger, such as a MCHEX, equipped with the capacity modulating assembly may be used in a HVAC system.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIG. 1A illustrates one of the expansion devices includes a flow control valve. FIG. 1B illustrates both of the expansion devices include a flow control valve. FIG. 1C illustrates that the outflow port may be equipped with a flow control valve. FIG. 1D illustrates that both of the expansion devices and the outflow port may be equipped with a flow control valve.

FIG. 2A illustrates a portion of a capacity modulating assembly including two expansion devices and an outflow port. FIG. 2B illustrates a portion of a capacity modulating assembly including two expansion devices. FIG. 2C illustrates an embodiment of an orifice in an expansion device. FIG. 2D illustrates an orifice check device.

FIGS. 3A and 3B illustrate an embodiment of an expansion device with a slidable sleeve. FIG. 3A is a perspective view. FIG. 3B is a sectional view.

FIG. 4A is a perspective view of the MCHEX.

FIG. 4B is an enlarged view of a header of the MCHEX in FIG. 4A, showing expansion devices extending inside the header. FIG. 4C is an end view of the header of the MCHEX.

FIGS. 6A and 6B illustrate MCHEXS that are equipped with two embodiments of a capacity modulating assembly with expansion devices extending inside a header of the MCHEX from opposing ends of the header. FIG. 6A illustrates that portions of the expansion devices can overlap inside the header of the MCHEX. FIG. 6B illustrates that the expansion devices may not overlap inside the header of the MCHEX.

FIGS. 7A to 7C illustrate three schematic diagrams of HVAC systems that include a MCHEX equipped with a capacity modulating assembly. FIG. 7A illustrates a HVAC system with two MCHEX, according to one embodiment. FIG. 7B illustrates a HVAC system with two MCHEX, according to another embodiment. FIG. 7C illustrates a HVAC system with one MCHEX and one co-axial heat exchanger.

DETAILED DESCRIPTION

Figure 1A:
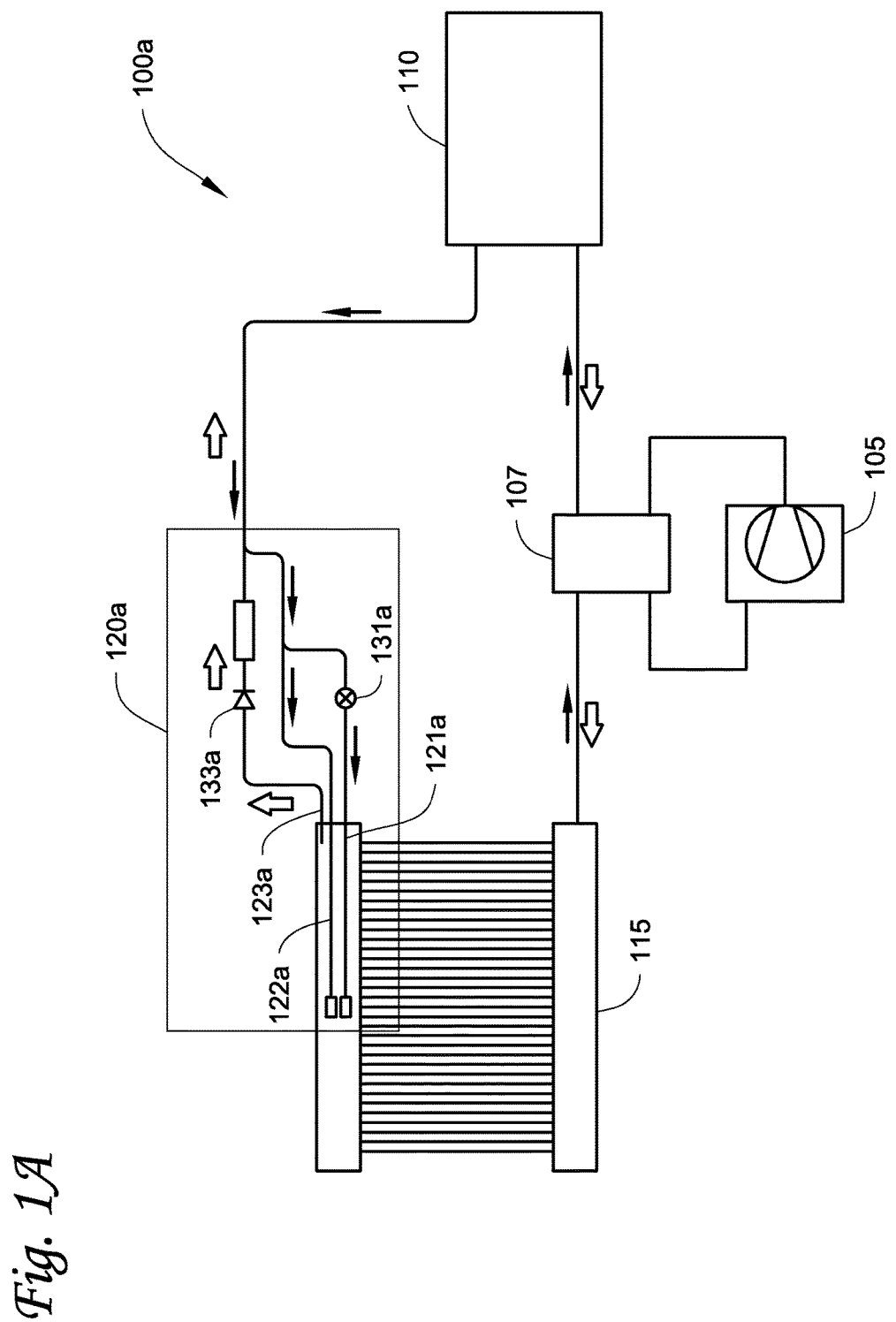
FIGS. 1A to 1D illustrate schematic diagrams of a refrigeration circuit of four different embodiments of HVAC systems that are equipped with a capacity modulating assembly, which generally includes two expansion devices and an outflow port

A HVAC system typically includes a compressor, a condenser, an expansion device and an evaporator. The expansion device, such as a thermal expansion valve or an electronically controlled expansion valve, may include a fixed orifice that is configured to expand liquid refrigerant to a two-phase refrigerant mixture and reduce the temperature of the refrigerant, when the liquid refrigerant flows through the orifice. The expansion device may also include a solenoid valve that can be opened or closed to modulate the expansion device, such as modulating a refrigerant flowing through the expansion device. The amount of refrigerant flowing through the expansion device may be regulated by controlling the time of the expansion device in the open (or closed) state. In a cooling cycle, the two-phase refrigerant mixture can be distributed into the evaporator so as to exchange heat with and condition, for example, air moving across outer surfaces of the evaporator. The two-phase refrigerant mixture can be vaporized to refrigerant vapor when leaving the evaporator, and directed back to the compressor. It may be desirable to keep the temperature of the refrigerant vapor relatively high (for example, about 10° F. to 20° F. superheat), so that the refrigerant exiting the evaporator is substantially refrigerant vapor.

Some HVAC systems may be able to operate at various loads, e.g. the HVAC systems can be operated at a full load condition and at least one partial load condition. For example, some HVAC systems may have more than one compressor. At the full load condition, all of the compressors may be in operation; at the partial load condition, one of the compressors may not be in operation. Some HVAC systems may have a variable speed compressor. The load of the HVAC system can be varied by varying, for example, the speed of the compressor. Load changes of the HVAC system can cause changes in a flow rate of the refrigerant flowing through the expansion device. For example, when the HVAC system operates at a partial load condition, the flow rate of the liquid refrigerant flowing through the expansion device may be less than the flow rate of the refrigerant flowing through the expansion device at the full load condition.

The variable refrigerant flow rate through the expansion device may affect the effectiveness of the expansion device with a fixed orifice. For example, in some embodiments, the fixed orifice may be optimized for the full load condition. However, when the HVAC system operates at a partial load condition, the flow rate of the refrigerant flowing through the orifice may be reduced and the orifice may become too large for expanding the liquid refrigerant effectively with the reduced flow rate. Consequently, refrigerant flowing through the expansion device may contain a relatively high liquid refrigerant content, causing a relatively low refrigerant temperature when the refrigerant exits the evaporator, reducing the effectiveness of the evaporator. When the refrigerant exits the evaporator, the exiting refrigerant may still contain liquid refrigerant. The liquid refrigerant may be directed into the compressor, causing a negative impact on, for example, a service life of the compressor. Improvements can be made to help maintain (and/or improve) the effectiveness of the expansion device of a HVAC system, such as a HVAC system with a variable load.

Another issue is when a MCHEX is used as an evaporator and/or a condenser in a HVAC system, distribution of the two-phase refrigerant mixture into the micro-channel tubes can be a complex refrigerant flow regime. Even distribution of the two-phase refrigerant mixture into the micro-channel tubes can be challenging. Poor distribution of the two-phase refrigerant mixture into the MCHEX header and subsequently into the micro-channel tubes can reduce the overall thermal performance of the MCHEX and can also increase a pressure drop. The pressure drop may also contribute further to uneven distribution of the refrigerant liquid/vapor mixture.

When the MCHEX is used with a HVAC system capable of operating at a variable load, refrigerant distribution can be even more challenging due to the variable refrigerant flow rate through the expansion device. Improvements can be made to help facilitate even distribution of the refrigerant in a MCHEX.

In the following description of the illustrated embodiments, methods, systems and apparatuses directed to a capacity modulating assembly of a HVAC system are described. Generally, the capacity modulating assembly can be configured to meter an amount of refrigerant flowing into, for example, a heat exchanger and may also incorporate one or more expansion devices to expand the refrigerant from the liquid state to the two-phase state. In some embodiments, the capacity modulating assembly can be connected with a heat exchanger, such as a MCHEX, that may function as an evaporator and/or condenser of the HVAC system. In some embodiments, the capacity modulating assembly may include a plurality of expansion devices, some of which may be connected to a flow control device. The flow control device can be closed so as to restrict refrigerant flow to the connected expansion device, or open to allow a refrigerant flow to the expansion device. The capacity modulation can be performed according to a flow rate of refrigerant flowing toward the capacity modulating assembly. For example, in some embodiments, some of the plurality of expansion devices can be closed when the HVAC system is operated at a partial load, when a flow rate of refrigerant flowing toward the capacity modulating assembly is relatively low. In some embodiments, all of the plurality of expansion devices can be opened, such as, when the HVAC system is operated at a full load and the refrigerant flow rate is relatively high. In some embodiments, the capacity modulating assembly can be configured to include a refrigerant outflow port, which may help direct refrigerant out of the heat exchanger relatively quickly, such as, in a heating cycle.

References are made to the accompanying drawings that form a part hereof, and in which are shown by way of illustrating embodiments that may be practiced. It is to be understood that the terms used herein are for the purpose of describing the figures and embodiments and should not be regarded as limiting the scope of the present application. The term "refrigerant" generally refers to refrigerant in any state, for example refrigerant in vapor state (or refrigerant vapor) or in liquid state (or liquid refrigerant). It is to be noted that the states of the refrigerant is dynamic. The terms "liquid refrigerant," "refrigerant vapor," "refrigerant in a liquid state," "refrigerant in a vapor state" are not absolute terms. The refrigerant can change between the vapor state and the liquid state constantly. Therefore, the liquid refrigerant may include some refrigerant vapor and the refrigerant vapor may include some liquid refrigerant. The terms "two-phase refrigerant mixture" generally refers to a state after the liquid refrigerant is expanded by an orifice or an expansion device. The "two-phase refrigerant mixture" generally has a lower temperature compared to refrigerant vapor or liquid refrigerant in the HVAC system.

FIGS. 1A to 1D disclose embodiments of HVAC systems 100a to 100d that incorporate a capacity modulating assembly (120a to 120d). The capacity modulating assembly (120a to 120d) can be connected to a heat exchanger (such as a MCHEX) that may function as an evaporator 115 and/or a condenser 110 of the HVAC system 100a to 100d.

As illustrated, FIGS. 1A to 1D show schematic diagrams of the HVAC systems 100a to 100d, respectively. The HVAC systems 100a to 100d generally include a compressor 105, a four-way valve 107, the condenser 110 and the evaporator 115 forming a refrigeration circuit. The HVAC systems 100a to 100d also include a capacity modulating assembly 120a to 120d respectively. The HVAC systems 100a to 100d may be configured to operate under a variable load.

The capacity modulating assemblies 120a to 120d generally include a plurality of expansion devices, such as a first expansion device 121a to 121d and a second expansion device 122a to 122d, respectively. The expansion devices 121a to 121d and 122a to 122d are generally configured to expand liquid refrigerant to a two-phase refrigerant mixture. In some embodiments, the first expansion devices 121a to 121d can be configured similarly to the second expansion devices 122a to 122d. In some embodiments, the first expansion devices 121a to 121d can be configured differently from the second expansion devices 122a to 122d. For example, the first expansion device 121a to 121d may be optimized for expanding refrigerant at a first refrigerant flow rate, while the second expansion devices 122a to 122d can be optimized for expanding refrigerant at a second refrigerant flow rate that is different from the first refrigerant flow rate.

The capacity modulating assemblies 120a to 120d can also include a refrigerant outflow port 123a to 123d respectively, with the appreciation that some embodiments may not include a refrigerant outflow port. When the capacity modulating assembly 120a to 120d is connected to the evaporator 115, for example, the refrigerant outflow port 123a to 123d can allow the refrigerant to flow out of the evaporator 115 relatively quickly and unrestricted, such as in a heating cycle. When the capacity modulating assembly 120a to 120d does not include the refrigerant outflow port 123a to 123d, the refrigerant can flow out of the evaporator 115 (which functions as a condenser when operating in the heating cycle) through the expansion devices 121a to 121d and/or 122a to 122d, such as when a heating cycle may be desired.

Generally, as illustrated in FIGS. 1A to 1D, at least one expansion device (121a to 121d) of the plurality of expansion devices (121a to 121d and 122a to 122d) in the capacity modulating assembly (120a to 120) is configured to be connected to a flow control device (131a to 131d), such as a solenoid valve. The flow control device 131a to 131 d may be configured to restrict or meter refrigerant flow to the connected expansion device 121a to 121d respectively. Capacity modulation of the capacity modulating assembly 120a to 120d can be performed by regulating (opening or closing) the flow control device 131a to 131d respectively. For example, when the flow rate of the refrigerant flowing to the capacity modulating assembly 120a to 120d is reduced such as in a partial load condition, the flow control device 131a to 131d can be used to close the expansion devices 121a to 121d so that the flow rate of the refrigerant flowing toward the other expansion devices 122a to 122d may be maintained compared to a full load condition.

The embodiments of the capacity modulating assembly as disclosed herein generally can be configured to control a total refrigerant flow rate toward the capacity modulating assembly, while expanding the refrigerant. Typically, a HVAC system incorporating the capacity modulating assembly does not need a separate expansion device, with the notion that a separate expansion device can be included in the HVAC system.

FIG. 1A illustrates that the capacity modulating assembly 120a includes a first flow control device 131a, such as a solenoid valve, connected to the first expansion device 121a. The second expansion device 122a is configured not to be connected with a flow control device. The refrigerant outflow port 123a can be configured to include an outflow control valve 133a, such as a check valve.

Figure 1B:
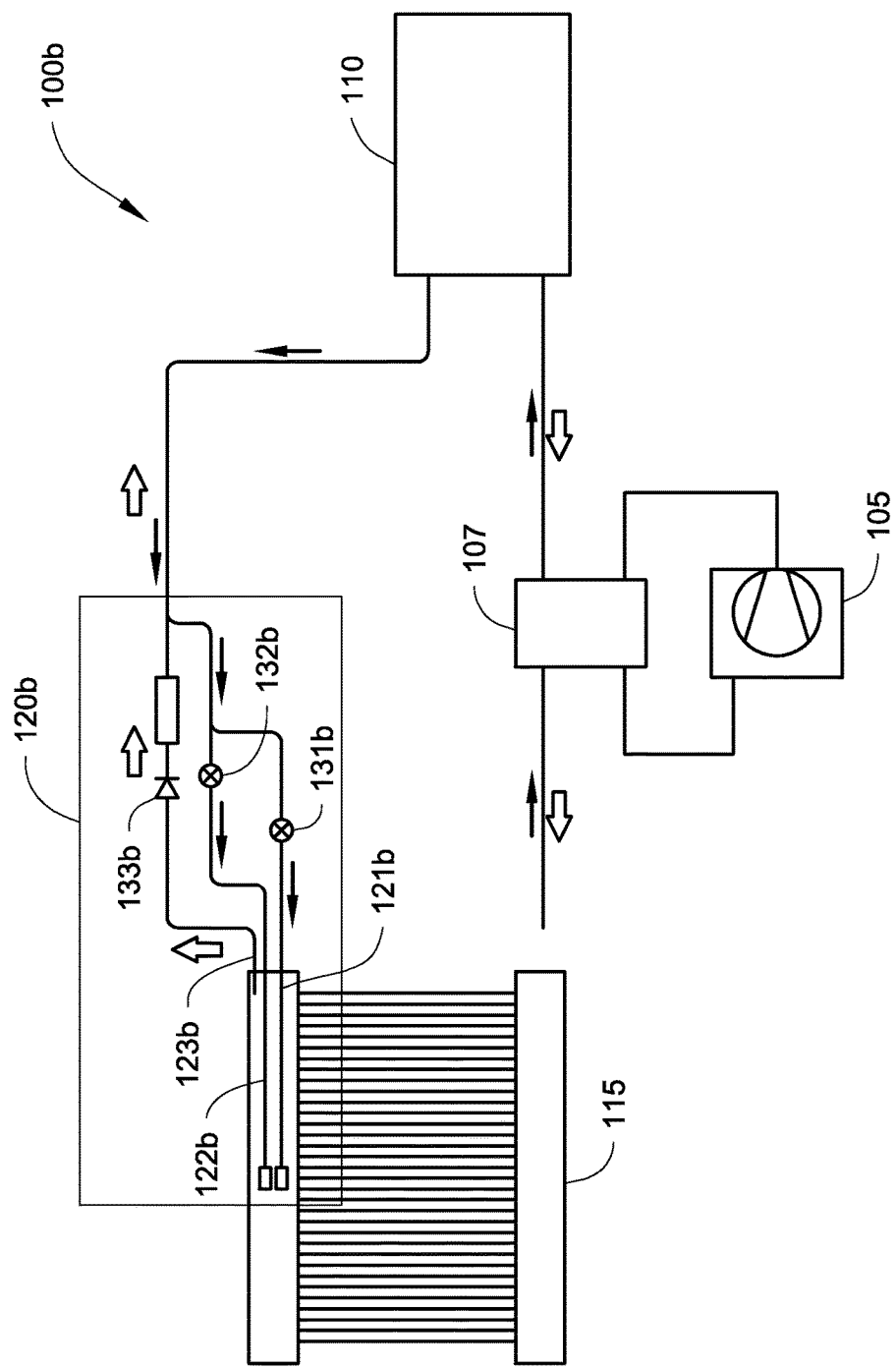

FIG. 1B illustrates that the capacity modulating assembly 120*b* includes a first flow control device 131*b*, such as a solenoid valve, connected to the first expansion device 121*b*. The second expansion device 122*b* is configured to be connected to a second flow control device 132*b*, such as a solenoid valve. The refrigerant outflow port 123*b* is configured to be connected to an outflow control valve 133*b*, such as a check valve.

Figure 1C:
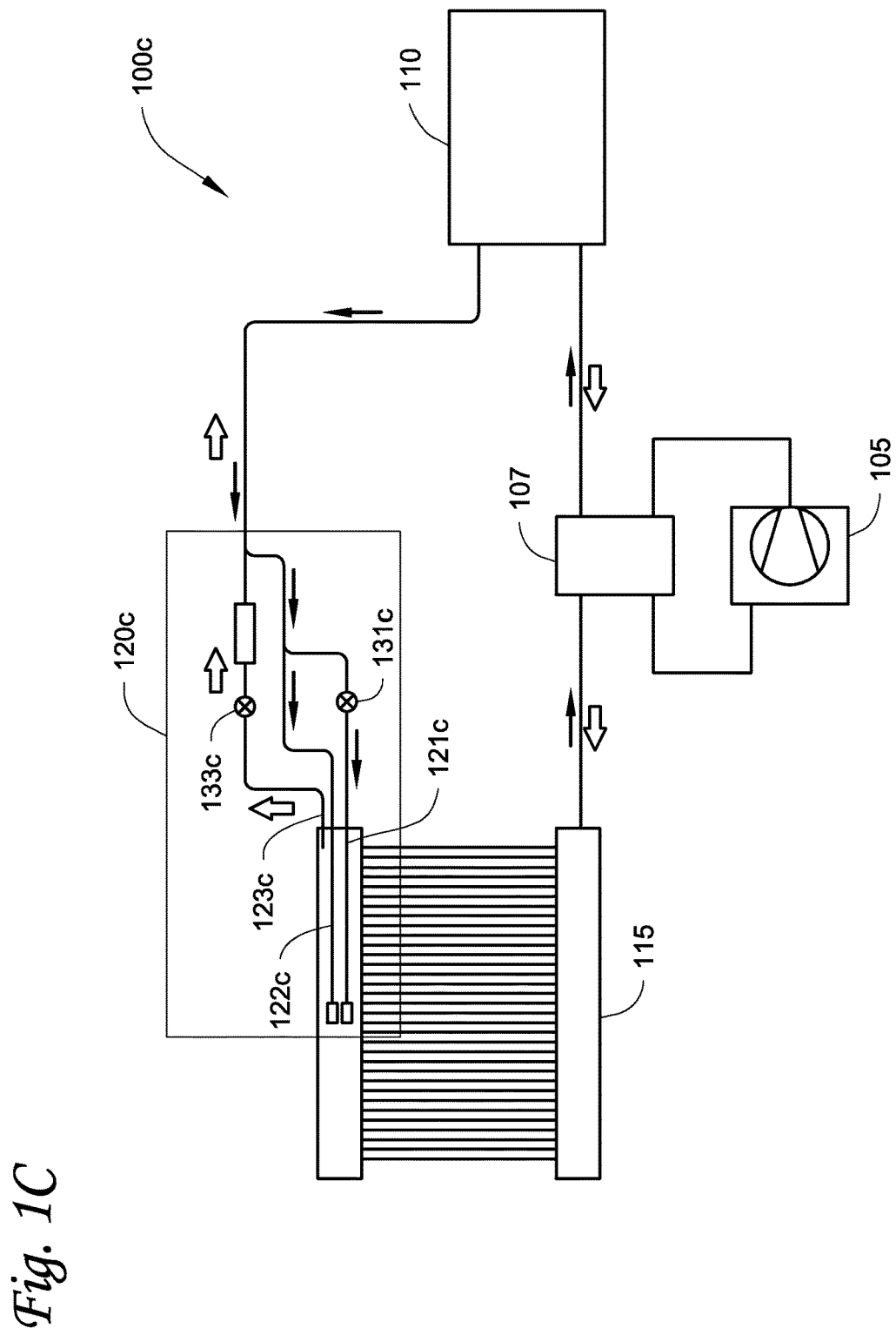

FIG. 1C illustrates that the capacity modulating assembly 120*c* includes a first flow control device 131*c*, such as a solenoid valve, connected to the first expansion device 121*c*. The second expansion device 122*c* is configured not to be connected to a flow control device. The refrigerant outflow port 123*c* is configured to include an outflow control device 133*c*, such as a solenoid valve.

Figure 1D:
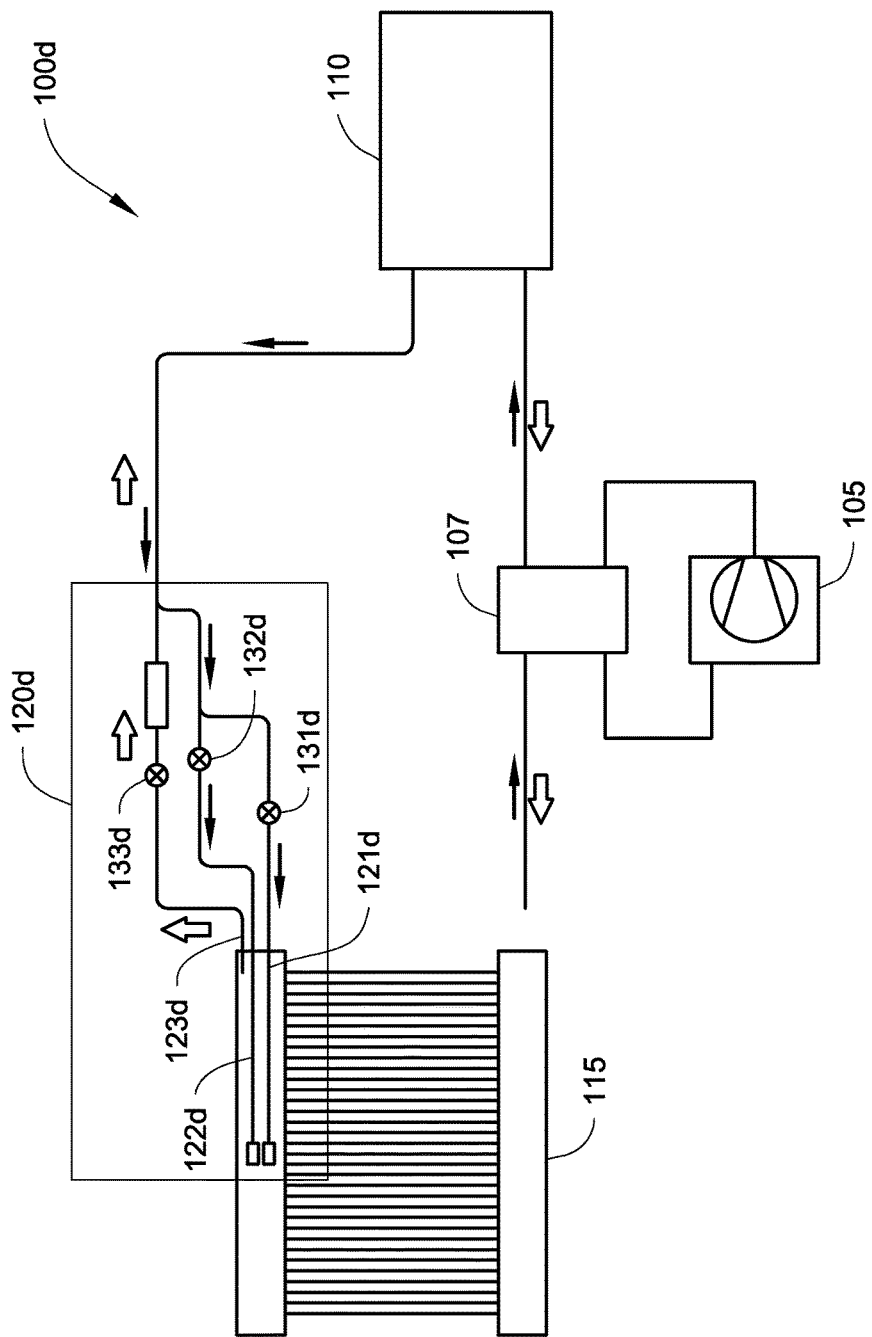

FIG. 1D illustrates that the capacity modulating assembly 120*d* includes a first flow control device 131*d*, such as a solenoid valve, connected to the first expansion device 121*d*. The second expansion device 122*d* is configured to include a second flow control device 132*d*, such as a solenoid valve. The refrigerant outflow port 123*d* is configured to include an outflow control device 133*d*, such as a solenoid valve.

The first expansion devices 121*a* to 121*d* and the second expansion devices 122*a* to 122*d* of the capacity modulating assemblies 120*a* to 120*d* respectively are generally configured to be able to expand liquid refrigerant to a two-phase refrigerant mixture. For example, the first expansion devices 121*a* to 121*d* and the second expansion devices 122*a* to 122*d* can be configured to include at least one orifice (such as the orifice 223*c* as shown in FIG. 2C). When liquid refrigerant flows through the orifice, the liquid refrigerant can be expanded into two-phase refrigerant mixture. It is appreciated that the first or second expansion devices 121*a* to 121*d*, 122*a* to 122*d* can have other configurations to expand refrigerant.

The capacity modulating assemblies 120*a* to 120*d*, including the first expansion device 121*a* to 121*d* and the second expansion device 122*a* to 122*d*, are configured to be connected to the evaporator 115, and regulate, for example, an amount of the two-phase refrigerant mixture directed to the evaporator 115. Capacity modulation can be achieved by controlling (e.g. closing or opening), for example, the first flow control device 131*a* to 131 *d*, and/or the second flow control device 132*b*, 132*d*.

The HVAC systems 100*a* to 100*d* can generally be configured to work in a cooling cycle and/or a heating cycle. Arrows show refrigerant flow directions in the cooling cycle; and block arrows show refrigerant flow directions in the heating cycle. In a cooling cycle, the refrigerant (e.g. liquid refrigerant) generally flows from the condenser 110 to the capacity modulating assembly 120*a* to 120*d*. The refrigerant can be expanded by the capacity modulating assembly 120*a* to 120*d*, and distributed to the connected evaporator 115. The HVAC system 100*a* to 100*d* can also be configured to operate in a heating cycle. In the heating cycle, the directions of the refrigerant flow are generally reversed from the cooling cycle. The liquid refrigerant generally flows from the evaporator 115 (which functions as a condenser in the heating cycle) toward the condenser 110 (which functions as an evaporator in the heating cycle). The liquid refrigerant can flow out of the evaporator 115 through the refrigerant outflow port 123*a* to 123*d*.

Referring to FIGS. 1A and 1C, the first expansion device 121*a*, 121*c* is connected to the first flow control device 131*a*, 131*c* respectively. The flow control device 131*a*, 131*c* can have an open state and a closed state. In the cooling cycle, when the first flow control device 131*a*, 131*c* is open, the liquid refrigerant from the condenser 110 can be distributed to both the first expansion device 121*a*, 121*c* and the second expansion device 122*a*, 122*c*. When the first flow control device 131*a*, 131*c* is closed, the liquid refrigerant can mainly be distributed to the second expansion device 122*a*, 122*c*.

Referring to FIGS. 1B and 1D, the first expansion device 121*b*, 121*d* is connected to the first flow control device 131*b*, 131*d* respectively; and the second expansion device 122*b*, 122*d* is connected to the second flow control device 132*b*, 132*d* respectively. The first flow control device 131*b*, 131*d* and/or the second flow control device 132*b*, 132*d* can be used to control the refrigerant flowing into the first expansion device 121*b*, 121*d* and/or the second expansion device 122*b*, 122*d*, respectively.

Any one or both of the flow control devices 131*a* to 131*d* and the second flow control devices 132*b* and 132*d* can be a solenoid valve, which generally has an open state and a closed state. In some embodiments, the solenoid valve can be fully closed to restrict (or prevent) the refrigerant flow, or fully open to allow the refrigerant flow. In some embodiments, the solenoid valve may be capable of being regulated between a fully open state and a fully closed state. The solenoid valve may be controlled, for example, by a controller (not shown) of the HVAC system 100*a* to 100*d*.

Figure 2A:
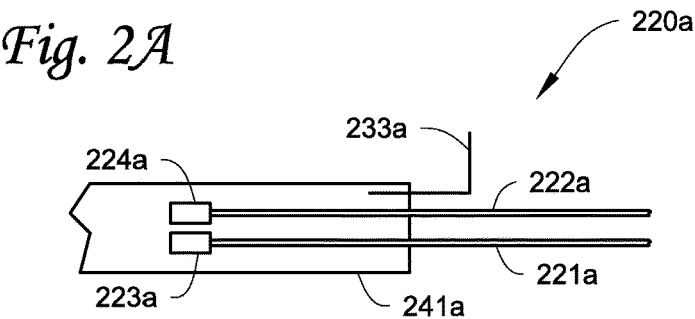
FIGS. 2A to 2D illustrate different embodiments of capacity modulating assemblies and component configurations of the capacity modulating assemblies.
Figure 2B:
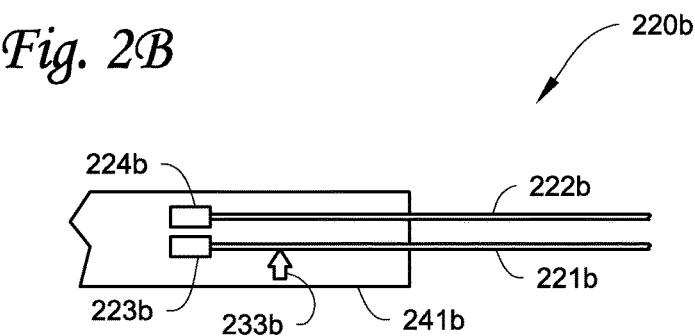
Figure 2C:
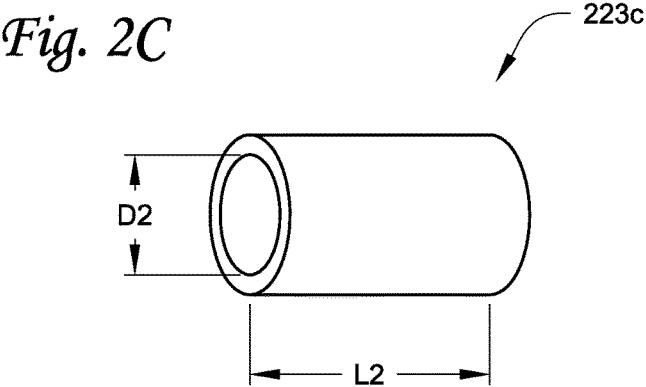

Referring to FIGS. 2A and 2B, partial views of capacity modulating assembly 220*a* and 220*b* are illustrated. As shown in FIG. 2A, the capacity modulating assembly 220*a* can include a first expansion device 221*a* and a second expansion device 222*a*. The capacity modulating assembly 220*a* can also include an outflow control device 233*a*. As illustrated in FIG. 2A, the outflow control device 233*a* and the first and second expansion devices 221*a* and 222*a* can be at least partially positioned inside a header 241*a* of a heat exchanger. The outflow control device 233*a* can be separate from the first and second expansion devices 221*a* and 222*a*. The outflow control device 233*a* can be configured to allow fluid to flow out of the header 241*a* relatively quickly. The first and second expansion devices 221*a* and 222*a* can include an expansion apparatus 223*a* and 224*a* respectively, which are positioned inside the header 241*a* in the illustrated embodiments. The expansion apparatuses 223*a* and 224*a* can be configured to meter and expand the refrigerant flowing in the header 241*a*. In some embodiments, the expansion apparatus 223*a* or 224*a* can be positioned at an end of the first or second expansion device 221*a* or 222*a* respectively.

Referring to FIG. 2B, the capacity modulating assembly 220*b* can be configured to include first and second expansion devices 221*b* and 222*b* respectively. The first and second expansion devices 221*b* and 222*b* can be partially positioned inside a header 241*b*. The first expansion device 221*a* can be configured to include an outflow control device 233*b* (e.g. a check valve) that is configured to allow fluid to flow out of the header 241*b* through the first expansion device 221*b* relatively quickly. The outflow control device 233*b* can be positioned inside the header 241*b*. By including the outflow control device 233*b* on the first expansion device 221*b* (with the understanding that the outflow control device 233*b* can also be positioned on the second expansion device 222*b*) and by positioning the outflow control device 233*b* inside the header 241*b*, a separate outflow control device (i.e. the outflow control device 233*a*) may no longer be required for directing the fluid out of the header 241*b* relatively quickly.

The first and second expansion devices 221*b* and 222*b* can include an expansion apparatus 223*b* and 224*b* respectively, which are positioned inside the header 241*b*. The expansion apparatus 221b and 222b can be configured to meter and expand the refrigerant flowing into the header 241a. In some embodiments, the expansion apparatus 223b or 224b can be positioned at an end of the first or second expansion devices 221b or 222b respectively.

Referring to FIG. 2C, the first expansion apparatus 223a, 223b and/or the second expansion apparatus 224a, 224b as illustrated in FIGS. 2A and 2B respectively can be configured to include an orifice 223c as shown in FIG. 2C. Referring to FIGS. 2A and 2B, the orifice 223c can be positioned at one end of the first expansion device 221a, 221b and/or the second expansion device 222a, 222b. The orifice 223c is generally a flow passage with a diameter D2 and a length L2. When liquid refrigerant flows through the orifice 223c, it can be expanded into a two-phase refrigerant mixture. The expansion effect of the orifice 223c may be affected by a length-to-diameter (L/D) ratio of the orifice 223c. The orifice 223c, including the L2/D2 ratio of the orifice 223c, can be configured to effectively expand the liquid refrigerant to two-phase refrigerant mixture at an optimized (range of) refrigerant flow rate(s). When the refrigerant flow rate is higher or lower than the optimized (range of) refrigerant flow rate(s), the effectiveness of the orifice 223c may be reduced.

It is to be appreciated that each of the orifices of the expansion device may be configured differently. For example, the L/D ratio of each of the orifices may be configured differently to achieve a desired refrigerant expansion effect optimized, for example, for a particular flow rate, depending on system requirements and/or limitations.

Figure 2D:
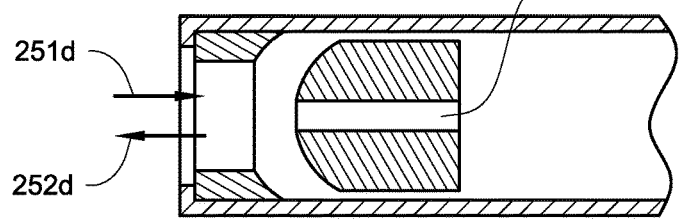

Referring to FIG. 2D, in some embodiments, the function of an outflow control device (e.g. the outflow control 233b in FIG. 2B) and an expansion apparatus (e.g. the expansion apparatus 223b FIG. 1B) can be replaced by an orifice check valve 223d. The orifice check valve 223d generally includes a check valve structure with an orifice 230d. In a first flow direction 251d, the orifice check valve 223d can be configured to allow a relatively free fluid flow; and in a second flow direction 252d, the orifice check valve 223d can be configured to meter a fluid flow through the orifice 230d. In the second flow direction 252d, the orifice 230d of the orifice check valve 223d can expand the refrigerant from a liquid state to a two-phase state. When the orifice check valve 223d is used in the embodiment as shown in FIG. 2A, for example, the separate outflow control device 233a may no longer be needed.

Referring back to FIGS. 1A to 1D, the HVAC systems 100a to 100d may be capable of operating at a variable load. A flow rate of the liquid refrigerant flowing toward the capacity modulating assembly 120a to 120d from the condenser 110 may be varied at different loads of the HVAC system 100a to 100d. Generally, the refrigerant flow rate is relatively high when the HVAC system 100a to 100d is operated at a full load; and the refrigerant flow rate is relatively reduced when the HVAC system 100a to 100d is operated at a partial load. For example, when the HVAC system 100a to 100d is operated at about 50% load, the refrigerant flow rate may be about 50% of the refrigerant flow rate at the full load. When the refrigerant flow rate varies, the capacity modulating assembly 120a to 120d can be modulated to, for example, maintain an effective expansion of the liquid refrigerant.

A method of modulating the capacity modulating assembly 120a to 120d includes closing the first flow control device 131a to 131d, and/or the second flow control device 132b, 132d, when the HVAC system 100a to 100d operates at a partial load (e.g. 50% load). The method may also include opening the first flow control device 131a to 131d, and/or the second flow control device 132b, 132d when the HVAC system 100a to 100d operates at the full load.

When the HVAC system 100a to 100d operates at the full load in the cooling cycle, the liquid refrigerant from the condenser 110 can be distributed to both the first expansion device 121a to 121d and the second expansion device 122a to 122d. Both of the first expansion device 121a to 121d and the second expansion device 122a to 122d can be optimized to expand the liquid refrigerant into the two-phase refrigerant mixture effectively when the HVAC system 100a to 100d is operated at the full load.

When the HVAC system 100a to 100d operates at a partial load (e.g. 50% load), the liquid refrigerant flow rate from the condenser 110 to the capacity modulating assembly 120a to 120d may be reduced. At the partial load, the first flow control device 131a to 131d, for example, can be closed, restricting (or preventing) the liquid refrigerant from flowing into the first expansion device 121a to 121d. The liquid refrigerant mainly flows into the second expansion device 122a to 122d at the partial load, which can help keep the liquid refrigerant flow rate to the second expansion device 122a to 122d at about the same as the liquid refrigerant flow rate to the second expansion device 122a to 122d at the full load condition, which may help maintain the effectiveness of the second expansion device 122a to 122d at the partial load.

In some embodiments, the HVAC system 100a to 100d may include one or more compressors 105 that can have a variable speed. The first expansion device 121a to 121d and the second expansion device 122a to 122d may be similarly configured. At the full load condition, when all of the compressors 105 may operate or a variable speed compressor 105 may operate at a maxim speed, the first flow control device 131a to 131d may be opened.

In a partial load condition, when one or more of the compressors 105 may be turned off or the variable speed compressor 105 may be operated at a relatively low speed, the first flow control device 131a to 131d connected to the first expansion device 121a to 121d may be closed.

It is to be appreciated that the embodiments as disclosed in FIGS. 1A to 1D are exemplary. In some embodiments, the capacity modulating assembly 120a to 120d may be configured to include more than two expansion devices. At least some of the expansion devices may be connected to a flow control device, such as a solenoid valve, so as to control the refrigerant flowing through the expansion devices. Capacity modulation can be performed by controlling (e.g. opening or closing) one or more of the flow control devices. In some embodiments, the flow control devices may have an open state and a closed state. In some embodiments, the flow control devices may be modulated between a fully open state and a fully closed state and the flow control devices can be set at a position between the fully open state and the fully closed state. The flow control devices can be modulated to, for example, optimize the effectiveness of expanding the refrigerant at various load conditions. It is to be appreciated that the method of modulating a capacity of the capacity modulating assembly is not limited to a partial load condition. The method can be generally used in a situation where the refrigerant flow rate to the capacity modulating assembly may be reduced. In some embodiments, for example, the refrigerant flow rate to the capacity modulating assembly may be reduced in a dehumidification mode. When the refrigerant flow rate to the capacity modulating assembly is reduced, the flow control device can be closed down or modulated to maintain, for example, the effectiveness of the expansion devices, It is to be appreciated that the systems and methods as disclosed herein may also be used to augment a refrigerant pump down cycle in the HVAC system. During the refrigerant pump down cycle, the flow control devices (such as the first flow control device 131*b* and the second flow control device 132*b* in FIG. 1B) can be closed to facilitate move refrigerant to the condenser (such as the condenser 110 in FIG. 1B).

The HVAC system 100*a* to 100*d* can also be configured to operate in a heating cycle. In the heating cycle, the directions of the refrigerant flow are generally reversed relative to the refrigerant flow direction in the cooling cycle. The liquid refrigerant generally flows from the evaporator 115 toward the condenser 110.

As illustrated in FIGS. 1A to 1D, the capacity modulating assembly 120*a* to 120*d* can be configured to include a refrigerant outflow port 123*a* to 123*d* respectively. The refrigerant outflow port 123*a* to 123*d* is generally configured to allow liquid refrigerant to flow out of the evaporator 115 relatively quickly, for example, in the heating cycle.

The refrigerant outflow port 123*a* to 123*d* may be equipped with the outflow control device 133*a* to 133*d* respectively. As shown in FIGS. 1A and 1B, the outflow control device 133*a*, 133*b* can be a check valve that is configured to allow refrigerant to flow in a direction from the evaporator 115 to the condenser 110, but generally block the refrigerant flow in a direction from the condenser 110 to the evaporator 115. As shown in FIGS. 1C and 1D, the outflow control device 133*c*, 133*d* can also be a solenoid valve.

It is to be appreciated that in some embodiments, the capacity modulating assembly 120*a* to 120*d* may not be equipped with the refrigerant outflow port 123*a* to 123*d*. In the heating cycle, the liquid refrigerant can flow out of the evaporator 115 through the first expansion devices 121*a* to 121*d*, and/or the second expansion device 122*a* to 122*d*. In some embodiments, the capacity modulating assembly can be equipped with an orifice check valve (e.g. the orifice check valve 233*d* in FIG. 2D) that allows the refrigerant to flow out of the evaporator 115.

FIGS. 3A and 3B illustrate another embodiment of expansion device 321 that has a barrel like structure. The expansion device 321 can include a plurality of orifices 325 spaced out along a longitudinal direction L3 of the barrel like structure. The expansion device 321 can also include a sleeve 350 that is configured to be disposed on the barrel like structure of the expansion device 321, and is slidable along the longitudinal direction L3 of the expansion device 321. When the sleeve 350 is slid along the expansion device 321, some or all of the orifices 325 can be closed by the sleeve 350. The sleeve 350 can work functionally like a flow control device.

When the refrigerant flow (shown in FIGS. 3A and 3B as the arrows) to the expansion device 321 is reduced, such as for example when a HVAC system is operated at a partial load condition, the sleeve 350 can slide to cover one or more of the plurality of orifices 325. Consequently, the refrigerant flow rate through the orifices 325 that are not covered by the sleeve 350 can be maintained at about the same as the refrigerant flow rate of the full load condition, which can help maintain the effectiveness of the orifices 325. The number of the orifices 325 that is covered by the sleeve 350 may be determined by the position of the sleeve 350 along the longitudinal direction L3.

When the expansion device 321 is, for example, used with the capacity modulating assembly 120*a* as illustrated in FIG. 1A, it may not necessary to use two separate expansion devices, such as 121*a*, 121*b*. The capacity modulating assembly 120*a* can be configured to only include one expansion device 321. It is appreciated that the capacity modulating assembly 120*a* can also be configured to include more than one expansion device 321.

Figure 4A:
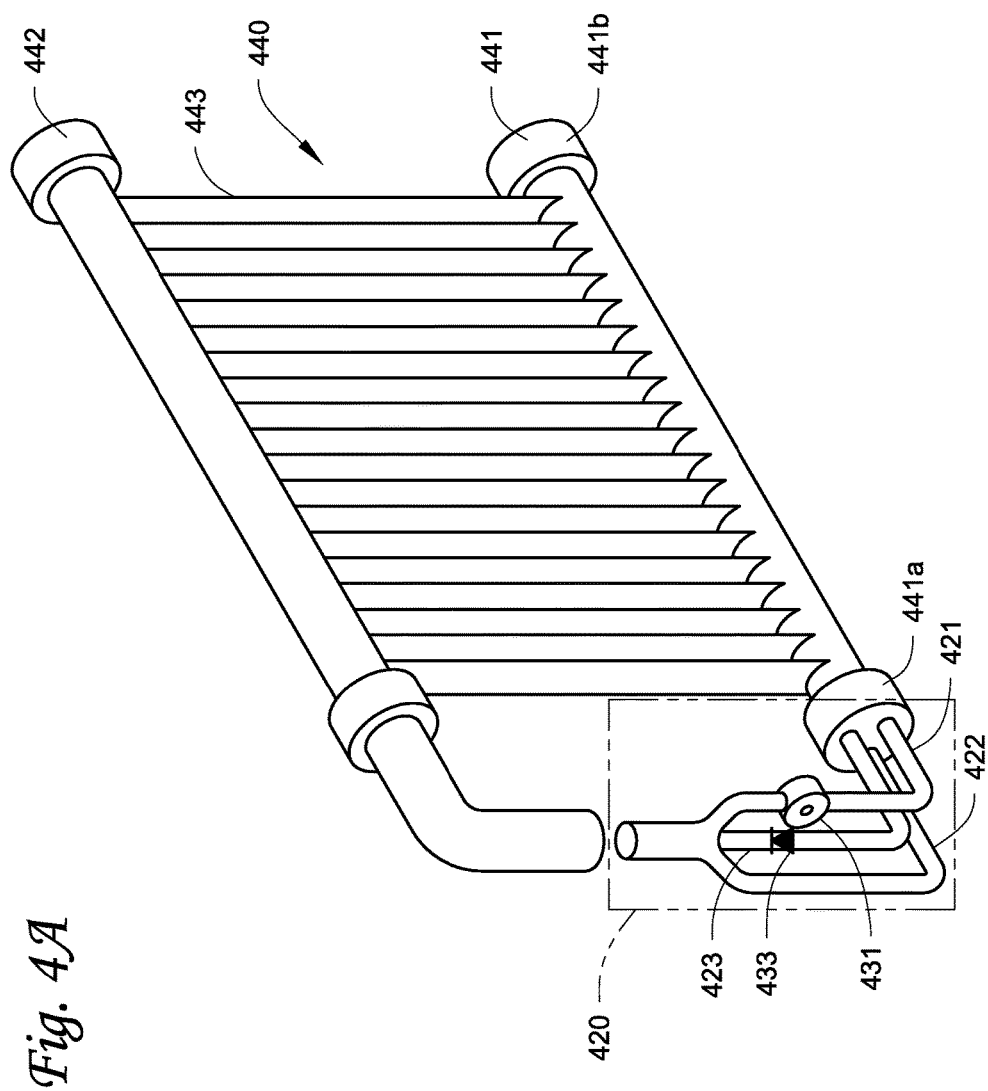
FIGS. 4A to 4C illustrate a MCHEX that is equipped with a capacity modulating assembly according to one embodiment.
Figure 4B:
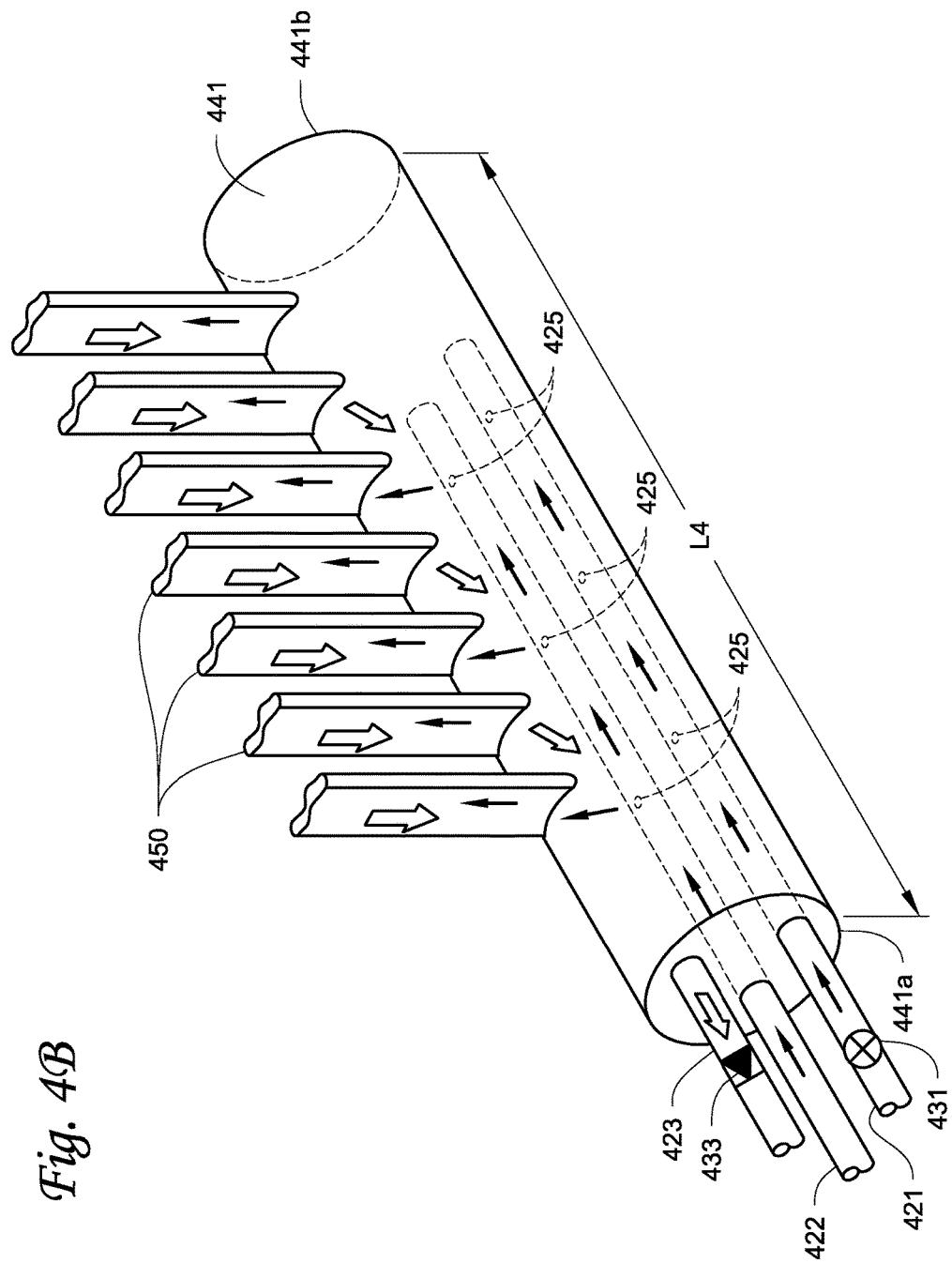
Figure 4C:
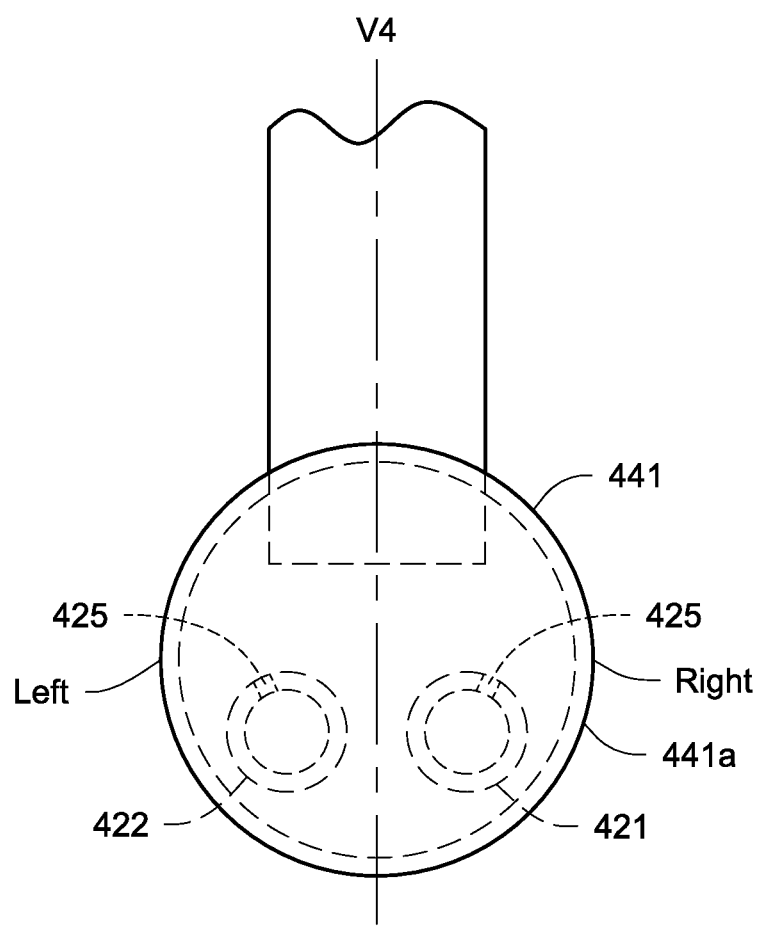

Embodiments of a capacity modulating assembly, such as illustrated in FIGS. 1A to 1D, can be connected to a heat exchanger, such as a MCHEX. FIGS. 4A to 4C illustrate a capacity modulating assembly 420 that is configured to be connected to a MCHEX 440. It is to be understood that the capacity modulating assembly as described herein can be connected to other types of heat exchangers.

As illustrated in FIG. 4A, the MCHEX includes a first header 441, a second header 442 and micro-channel tubes 443 extending between the first header 441 and the second header 442. The capacity modulating assembly 420 is connected to the first header 441. The first header 441 has a first end 441*a* and a second end 441*b*. The capacity modulating assembly 420 includes a first expansion device 421 that is connected to a first flow control device 431, a second expansion device 422, and a refrigerant outflow port 423 that is connected to an outflow control valve 433, such as a check valve. The first expansion device 421 and the second expansion device 422 are configured to be connected to the same end (i.e. the first end 441*a*) of the header 441.

As illustrated in FIG. 4B, the first expansion device 421 and the second expansion device 422 are configured to extend into the header 441 in a longitudinal direction that is defined by a length L4 of the header 441. The first expansion device 421 and the second expansion device 422 are generally positioned side by side in the longitudinal direction. (See also FIG. 4C) It is appreciated that the first expansion device 421 and the second expansion device 422 may be positioned off-set in a vertical direction relative to the orientation as shown.

In the illustrated embodiment, each of the first expansion device 421 and the second expansion device 422 includes a plurality of orifices 425. The plurality of orifices 425 are located inside the header 441 and are spaced out in the longitudinal direction along the first expansion device 421 or the second expansion device 422. Spacing out the orifices 415 in the longitudinal direction inside the header 441 may help distribute two-phase refrigerant mixture into the micro-channel tubes 450 evenly. Generally, the first expansion device 421 and the second expansion device 422 may be arranged so that the plurality of orifices 425 are not blocked by the first expansion device 421 or the second expansion device 422.

In the illustrated embodiment, the orifices 425 on the first expansion device 421 and the orifices 425 on the second expansion device 422 are off-set in the longitudinal direction. Off-setting the orifices 425 on the first expansion device 421 from the orifices 425 of the second expansion device 422 in the longitudinal direction defined by the length L4 can help distribute refrigerant evenly, for example, in the full load condition when all of the orifices 425 are used. However, it is to be understood that in some embodiments, the orifices 425 may not be off-set in the longitudinal direction.

FIG. 4C illustrates an end view from the first end 441*a* of the header 441. As illustrated in FIG. 4C, the orifices 425 of the first expansion device 421 and the orifices 425 of the second expansion device 422 can be configured to point away from each other. In the orientation as shown in FIG. 4C, the first expansion device 421 is positioned to the right of the second expansion device 422. The orifice 425 of the first expansion device 421 tilts toward the right side, and the orifice 425 of the second expansion device 422 tilts toward the left side in the orientation as shown. When refrigerant is distributed by the first and second expansion devices 421 and 422, the refrigerant is directed away from each other. This configuration may help distribute the refrigerant evenly inside the header 441.

The MCHEX can be used as an evaporator in some embodiments. In a cooling cycle, the refrigerant can be directed out of the orifices 425 along the first expansion device 421 and the second expansion device 422 inside the header 441. If the refrigerant flow rate toward the capacity modulating assembly 420 is reduced, for example, in a partial load condition, the first flow control device 431 can be closed. The refrigerant is then mainly distributed into the header 441 from the second expansion device 422.

In a heating cycle, the refrigerant can be collected in the header 441 and be directed out of the refrigerant outflow port 423 by opening the check valve 433. It is to be appreciated that in some embodiments, the capacity modulating assembly 420 may not include the refrigerant outflow port 423. The liquid refrigerant can be directed out of the header 441 from the plurality of orifices 425.

The configurations of the expansion devices 421 and 422 are exemplary. Other expansion device configurations can also be incorporated into the capacity modulating assembly 420. For example, the capacity modulating assembly 420 may incorporate the expansion device 321 as illustrated in FIG. 3.

Figure 5:
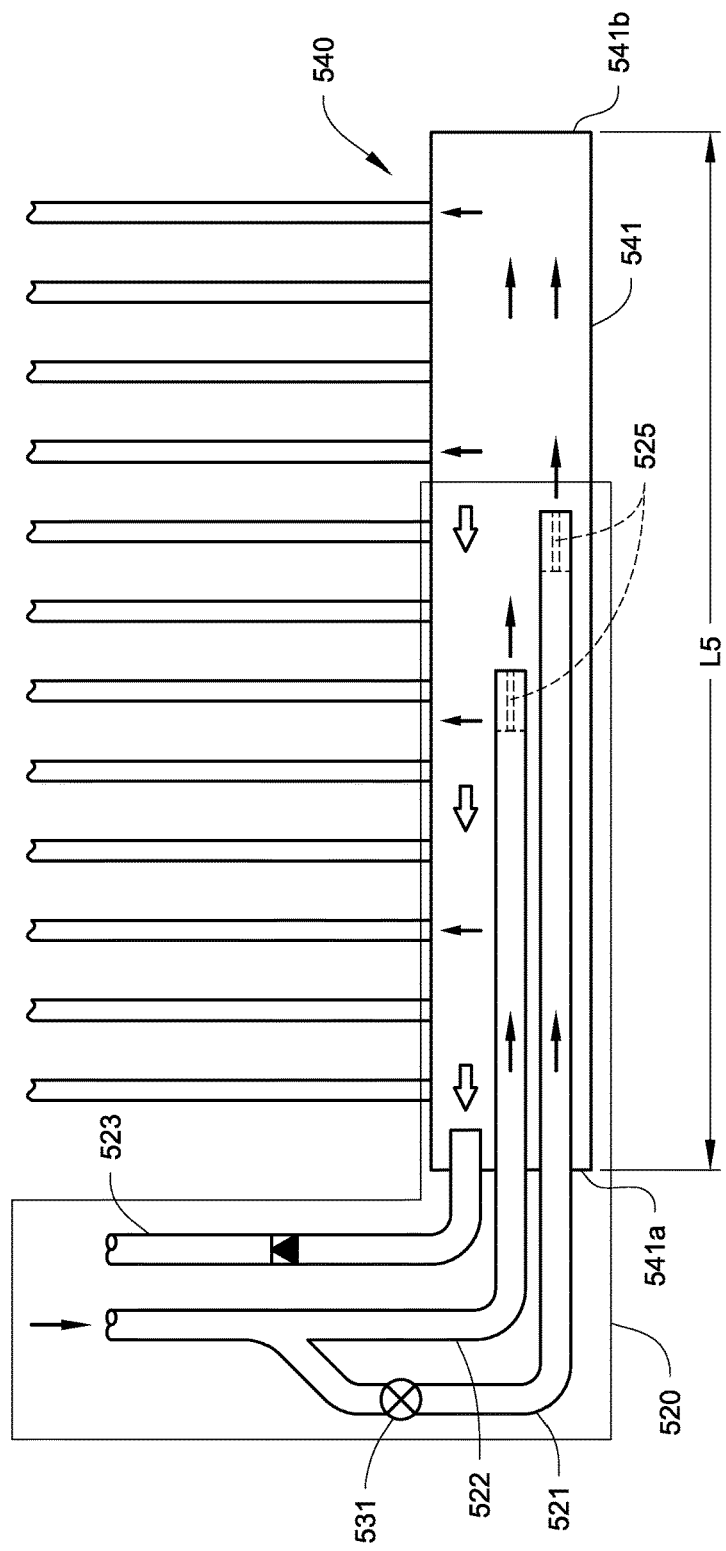
FIG. 5 illustrates a MCHEX that is equipped with a capacity modulating assembly according to another embodiment.

FIG. 5 illustrates another embodiment of a capacity modulating assembly 520 that is connected to a MCHEX 540. The capacity modulating assembly 520 can include a first expansion device 521 connected to a flow control device 531, a second expansion device 522 and a refrigerant outflow port 523. The MCHEX 540 has a header 541 that includes a first end 541a and a second end 541b.

The first expansion device 521 and the second expansion device 522 can extend into the header 541 from the first end 541a of the header 541. As shown, the first expansion device 521 and the second expansion device 522 each include one orifice 525 (can include more than one) at an end of the first and second expansion devices 521 and 522 inside the header 541. As illustrated, the orifices 525 may be positioned at different locations along a length L5 of the header 541, with the appreciation that the orifices 525 may be positioned at the same locations along the length L5. In some embodiments, such as when a MCHEX with a relatively small capacity is used, one orifice in each of the first expansion device 521 and the second expansion device 522 may be sufficient for even distribution of the refrigerant. In some embodiments, such as when a MCHEX with a relatively large capacity is used, a plurality of orifices in at least one of the first and second expansion devices 521, 522 may be helpful for even refrigerant distribution. Positioning the orifices 525 at different locations along the length L5 may help evenly distribute the refrigerant, for example, in a full load condition.

In some embodiments, the first expansion device 521 and the second expansion device 522 can be positioned side by side (similar to the configuration as shown in FIGS. 4B and 4C). In some embodiments, the first expansion device 521 and the second expansion device 522 can be arranged in an upper and lower arrangement in a vertical direction as shown in FIG. 5.

Figure 6B:
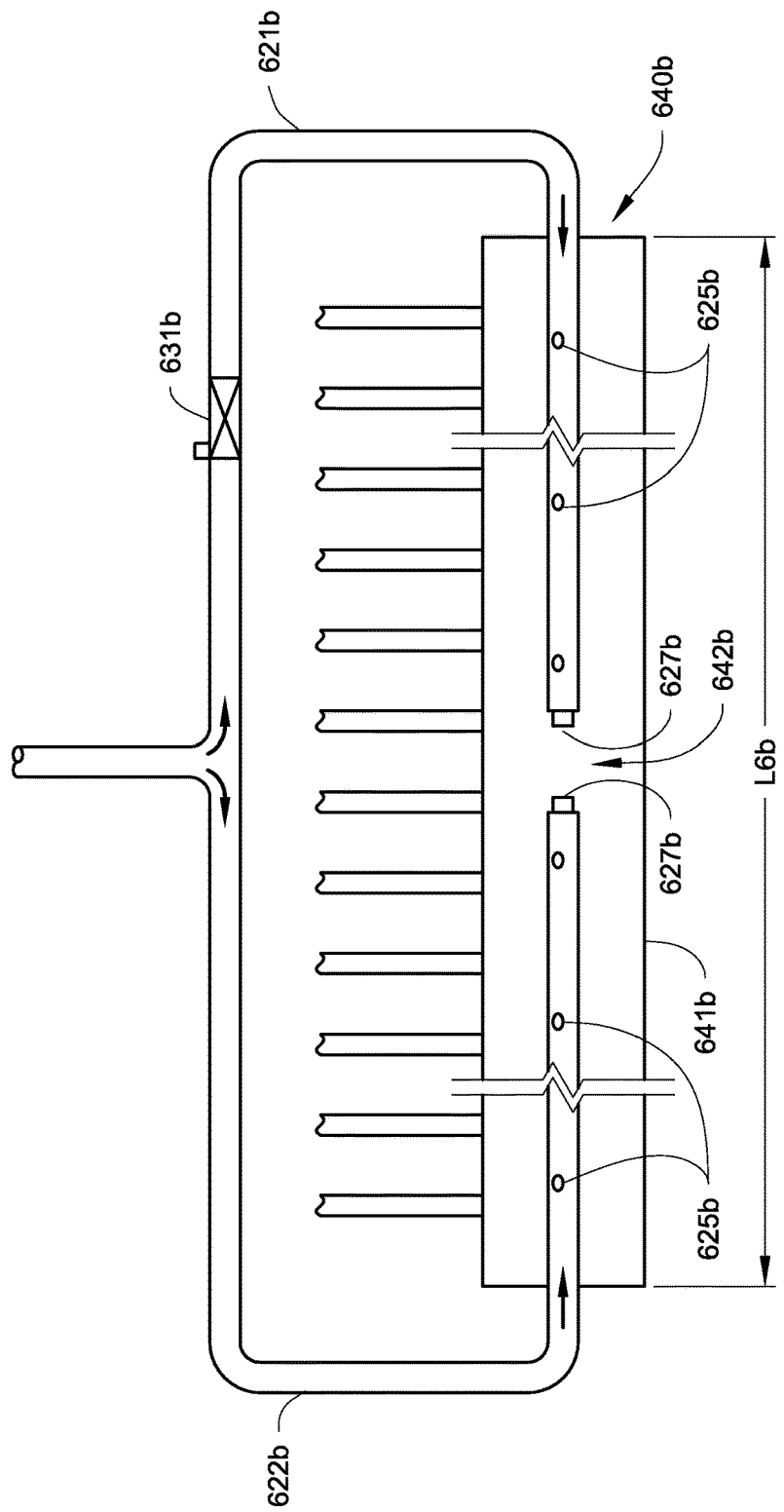

FIGS. 6A and 6B illustrate another two embodiments of MCHEX 640a and 640b. As illustrated in FIG. 6A, the MCHEX 640a includes a header 641a. A first expansion device 621a and a second expansion device 622a enter the header 641a from two opposite ends of the header 640a. The first expansion device 621a and the second expansion device 622a include one or more orifices 625a inside the header 641a. Portions of the first expansion device 621a and the second expansion device 622a can overlap in a longitudinal direction that is defined by a length L6a of the header 640a. The first expansion device 621a is connected to a flow control device 631a. The orifices 625a on the first expansion device 621a and the second expansion device 622a may be positioned off-set from each other along the length L6a.

As illustrated in FIG. 6B, the MCHEX 640b includes a header 641b. A first expansion device 621b and a second expansion device 622b extend into the header 641b from opposite ends of the header 641b, and approach from each other at about a middle portion 642b of a length L6b of the header 641b. The first expansion device 621b and the second expansion device 622b do not overlap in a longitudinal direction that is defined by the length L6b.

The first expansion device 621b and the second expansion device 622b include end caps 627b to seal an end of the first and second expansion devices 621b and 622b respectively. The first and second expansion devices 621b and 622b each can also include a plurality of orifices 625b. The first expansion device 621b can be connected to a flow control device 631b.

Figure 7B:
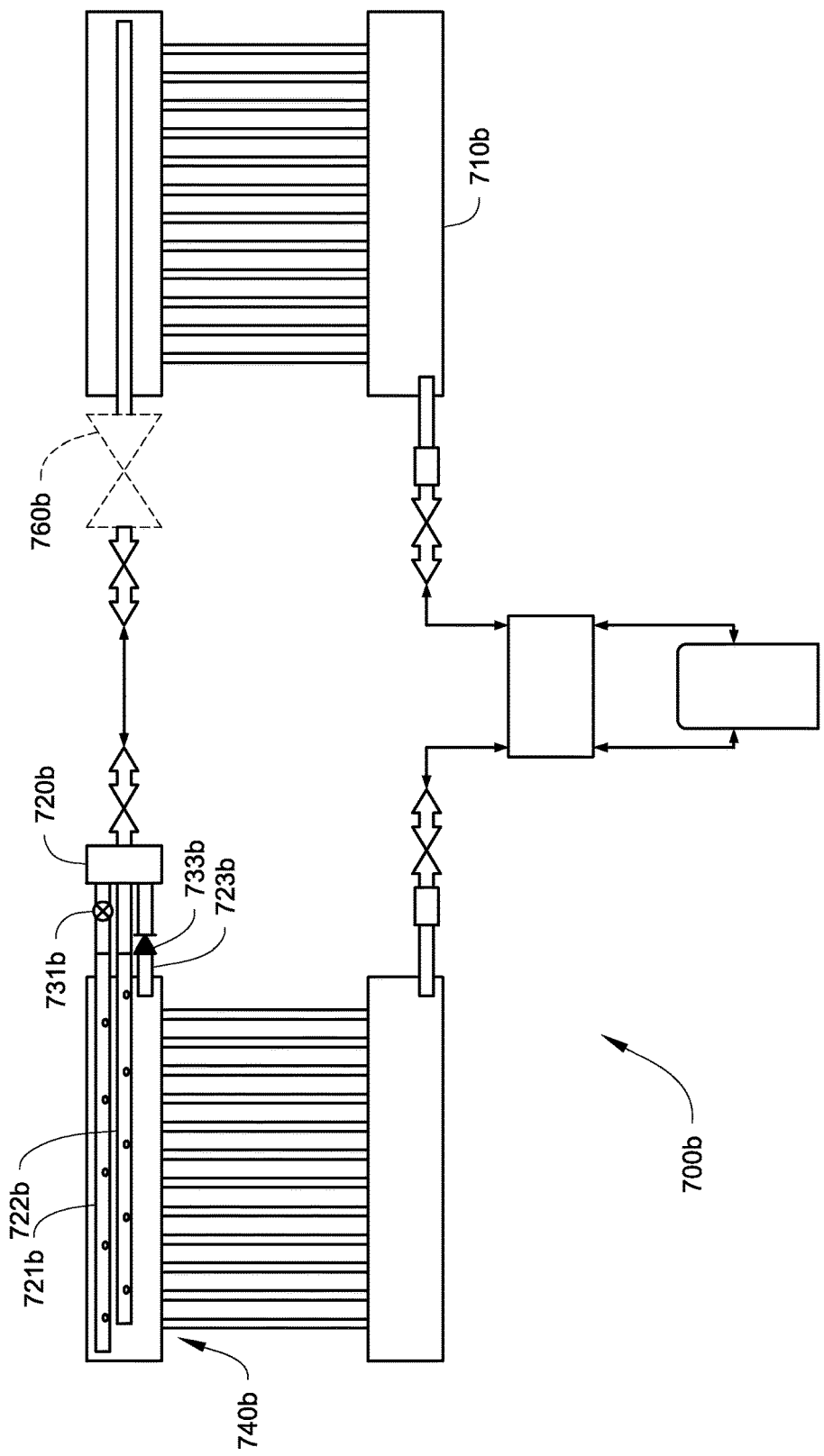
Figure 7C:
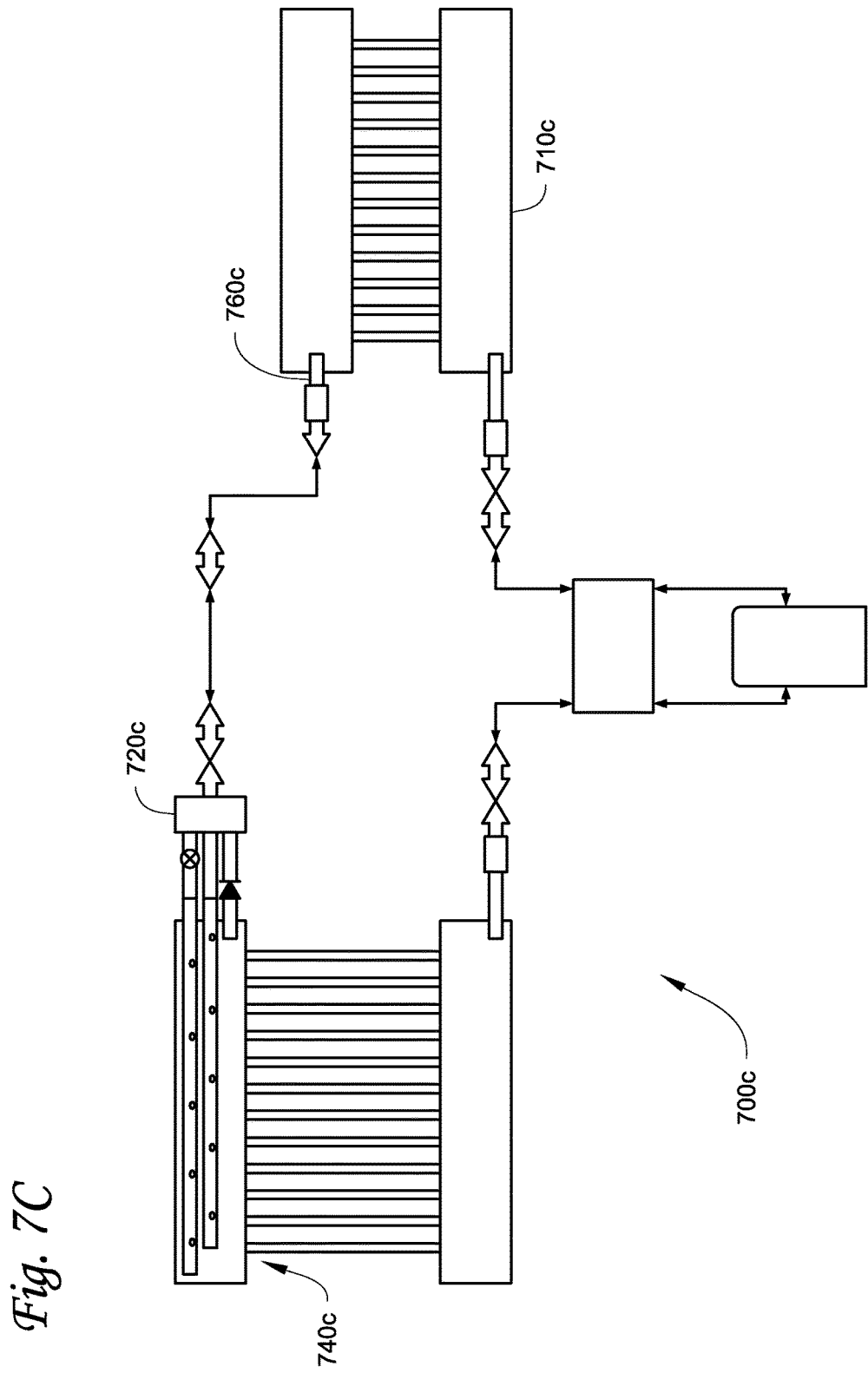

MCHEX equipped with a capacity modulating assembly can be used in a refrigeration circuit (including, for example a heat pump, a HVAC system, or a refrigeration system) as an evaporator and/or a condenser. FIGS. 7A to 7C illustrate exemplary schematic diagrams of a refrigeration circuit 700a to 700c that uses a MCHEX equipped with a capacity modulating assembly 720a to 720c as an evaporator 740a to 740c respectively. It is noted that the capacity modulating assemblies 720a to 720c as illustrated are exemplary. Differently configured capacity modulating assemblies, such as illustrated in FIGS. 1A to 1D and FIG. 3A to 6B, can also be used in the refrigeration circuit 700a to 700c.

As illustrated in FIG. 7A, a condenser 710a of the refrigeration circuit 700a can be configured to be a MCHEX that is equipped with a second capacity modulating assembly 760a, which may be any capacity modulating assembly such as for example described with respect to FIGS. 1A to 1D and FIGS. 3A to 6B. In a cooling cycle, an outflow control device 773a (such as a solenoid valve) for a second refrigerant outflow port 763a in the condenser 710a is open. Liquid refrigerant can flow from the condenser 710a to the capacity modulating assembly 720a of the evaporator 740a relatively freely. The liquid refrigerant is expanded by a first expansion device 721a and/or a second expansion device 722a inside a header 741a of the evaporator 740a. In a heating cycle, an outflow control device 733a (such as a check valve) of a refrigerant outflow port 723a of the capacity modulating assembly 720a in the evaporator 740a is open. Liquid refrigerant can flow from the evaporator 740a to the condenser 710a. The liquid refrigerant is expanded inside a header 711a of the condenser 710a by a third expansion device 761a and a fourth expansion device 762a.

As illustrated in FIG. 7A, the first expansion device 721a is connected to a first flow control device 731a; and the third expansion device 761a is connected to a second flow control device 771a. The capacity modulating assembly 720a and/or the second capacity modulating assembly 760a can be independently modulated in this configuration. For example, in a cooling cycle, when the refrigeration circuit 700a is in a partial load, the flow control device 731a can be closed to prevent refrigerant from flowing through the flow control device 731a, thus reducing the refrigerant flow to the first expansion device 721a. In the cooling cycle, the flow control device 771*a* can be fully open. In a heating cycle, when the refrigeration circuit 700*a* is in a partial load, the flow control device 771*a* can be closed to prevent refrigerant from flowing through the flow control device 771*a*. In the heating mode, the flow control device 731*a* can be fully open.

As illustrated in FIG. 7B, the capacity modulating assembly 720*b* connected to the evaporator 740*b* includes a first expansion device 721*b* connected to a first flow control device 731*b* (such as a solenoid valve), a second expansion device 722*b*, and a refrigerant outflow port 723*b* connected to an outflow control device 733*b* (such as a check valve or a solenoid valve). A condenser 710*b* can be a conventional heat exchanger or a MCHEX.

In a cooling cycle, liquid refrigerant flows from the condenser 710*b* to the capacity modulating assembly 720*b*, and is expanded by the first expansion device 721*b* and/or the second expansion device 722*b*. In a heating cycle, liquid refrigerant flows out of the refrigerant outflow port 723*b*. The liquid refrigerant can then be expanded, for example, by an optional conventional expansion device 760*b* and directed into the condenser 710*b* which functions as an evaporator in the heating cycle.

In some embodiments, the outflow control device 733*b* can be configured to remain closed in the heating cycle (or the capacity modulating assembly 720*b* may be configured to not include a refrigerant outflow port). The liquid refrigerant collected in a header of the evaporator 740*b* can be directed through the first expansion device 721*b* and/or the second expansion device 722*b* in the heating cycle. The liquid refrigerant can be expanded to a two-phase refrigerant mixture by the first expansion device 721*b* and/or the second expansion device 722*b* in the process. The two-phase refrigerant mixture can then be directed into the condenser 710*b*. In this configuration, the first expansion device 721*b* and/or the second expansion device 722*b* work as the primary expansion device in the heating cycle, and the optional conventional expansion device 760*b* may not be necessary. By controlling the first flow control device 731*b*, capacity modulation in the heating cycle and the cooling cycle can be achieved.

As illustrated in FIG. 7C, the evaporator 740*c* equipped with a capacity modulating assembly 720*c* can be used with a co-axial heat exchanger 710*c*. The co-axial heat exchanger 710*c* can be equipped with, for example, a short-orifice expansion device 760*c* (such as for example an orifice check valve). The expansion device 760*c* can be configured to allow refrigerant free-flowing in a cooling cycle. In the cooling cycle, liquid refrigerant flows from the co-axial heat exchanger 710*c* to the capacity modulating assembly 720*c*. In the heating cycle, liquid refrigerant flows from the evaporator 740*c* to the co-axial heat exchanger 710*c*. The expansion device 760*c* can expand the liquid refrigerant into a two-phase refrigerant mixture and distribute the two-phase refrigerant mixture to the co-axial heat exchanger 710*c* in the heating cycle.

It is to be appreciated that the embodiments as disclosed herein are exemplary. Generally, the capacity modulating assembly can be used with different types of heat exchangers, including for example a MCHEX. Heat exchangers equipped with the capacity modulating assembly can also be used as the evaporator and/or the condenser in the refrigeration circuit, and perform capacity modulation in the cooling and/or heating cycle. When the capacity modulating assembly is used with a MCHEX, at least one expansion device of the capacity modulating assembly can be extended into a header of the MCHEX, and the expansion device may include one or more orifices positioned inside the header of the MCHEX. In some embodiments, some or all of the plurality of expansion devices of the capacity modulating assembly can be extended into the header of the MCHEX; and all of the orifices of the plurality of expansion devices can be positioned inside the header of the MCHEX.

The embodiments as illustrated in the figures generally show that the at least a portion of the capacity modulating device is external to the heat exchanger header. It is to be understood that this is not necessary. In some embodiments, the entire capacity modulating device, including the check valve and/or the solenoid valve, can be installed inside the heat exchanger header.

Aspects

Any of aspects 1-10 can be combined with any of aspects 11-20. Any of aspects 11-18 can be combined with any of aspects 19, 20.

Aspect 1. A micro-channel heat exchanger, comprising:
 a header;
 a plurality of micro-channel tubes configured to form fluid communication with the header; and
 a capacity modulating assembly connected to the header, wherein the capacity modulating assembly includes a plurality of expansion devices, a first flow control device connected to one of the plurality of expansion devices;
 the first flow control device has an open state and a closed state, the closed state is configured to restrict refrigerant to the one of the plurality of expansion devices, and the open state is configured to allow refrigerant to flow to the one of the plurality of expansion devices.

Aspect 2. The micro-channel heat exchanger of aspect 1, wherein the plurality of expansion devices are configured to extend in a longitudinal direction inside the header.

Aspect 3. The micro-channel heat exchanger of aspects 1-2, wherein each of the plurality of expansion devices includes at least one orifice.

Aspect 4. The micro-channel heat exchanger of aspect 3, wherein the orifices of the plurality of expansion devices are configured to be positioned inside the header of a micro-channel heat exchanger.

Aspect 5. The micro-channel heat exchanger of aspects 3-4, wherein the orifices of the plurality of expansion devices are off-set from each other in the longitudinal direction inside the header.

Aspect 6. The micro-channel heat exchanger of aspects 1-5, wherein the plurality of expansion devices are configured to extend into the header from one end of the header.

Aspect 7. The micro-channel heat exchanger of aspects 1-6, wherein the first flow control device is a solenoid valve.

Aspect 8. The micro-channel heat exchanger of aspects 1-7, further comprising:
 a refrigerant outflow port; and
 an outflow control device that is connected to the refrigerant outflow port;
 wherein the outflow control device has an open state and a closed state, the open state is configured to allow refrigerant to flow out of the header through the refrigerant outflow port, and the closed state is configured to restrict refrigerant from flowing out of the header through the refrigerant outflow port.

Aspect 9. The micro-channel heat exchanger of aspect 8, wherein the outflow control device is a check valve.

Aspect 10. The capacity modulating assembly of aspects 1-9, wherein the outflow control device is a solenoid valve.

Aspect 11. A capacity modulating assembly, comprising:
 a plurality of expansion devices; and a first flow control device connected to at least one of the plurality of expansion devices;
wherein the first flow control device has an open state and a closed state, the closed state is configured to prevent refrigerant from flowing toward the connected expansion devices, and the open state is configured to allow refrigerant to flow toward the connected expansion devices.

Aspect 12. The capacity modulating assembly of aspect 11, wherein each of the plurality of expansion devices includes at least one orifice.

Aspect 13. The capacity modulating assembly of aspect 12, wherein the orifices of the plurality of expansion devices are configured to be positioned in a header of a heat exchanger.

Aspect 14. The capacity modulating assembly of aspect 13, wherein the heat exchanger is a microchannel heat exchanger.

Aspect 15. The capacity modulating assembly of aspects 11-14, wherein the first flow control device is a solenoid valve.

Aspect 16. The capacity modulating assembly of aspects 11-15, further comprising:
 a refrigerant outflow port; and
 an outflow control device that is connected to the refrigerant outflow port;
wherein the outflow control device has an open state and a closed state, the open state is configured to allow refrigerant to flow through the refrigerant outflow port, and the closed state is configured to prevent refrigerant from flowing through the refrigerant outflow port.

Aspect 17. The capacity modulating assembly of aspect 16, wherein the outflow control device is a check valve.

Aspect 18. The capacity modulating assembly of aspects 16-17, wherein the outflow control device is a solenoid valve.

Aspect 19. A capacity modulating assembly, comprising:
 an expansion device that includes a plurality of orifices; and
 a slidable sleeve slideably disposed on the expansion device, wherein
 the slidable sleeve is configured so that when the slidable sleeve slides on the expansion device, a number of the plurality of orifices covered by the slidable sleeve can be varied.

Aspect 20. A method of modulating a capacity of a heat exchanger, comprising:
 providing a plurality of orifices;
 opening all the plurality of orifices, when the heat exchanger is operated at a full load condition; and
 closing at least one of the plurality of orifices, when the heat exchanger is operated at a partial load condition.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A heat exchanger, comprising:
a header;
a plurality of flattened tubes configured to form fluid communication with the header; and
a capacity modulating assembly connected to the header, wherein the capacity modulating assembly is configured to modulate capacity according to a refrigerant flow rate, and includes a plurality of expansion devices and a first flow control device connected to at least one of the plurality of expansion devices,
wherein each of the plurality of expansion devices is configured to expand refrigerant at a refrigerant flow rate different from each other;
wherein each of the plurality of expansion devices has a terminating end and are separate from each other, and each of the plurality of expansion devices extends in a longitudinal direction of the header, and
wherein the first flow control device has an open state and a closed state, the closed state is configured to restrict refrigerant to the at least one of the plurality of expansion devices, and the open state is configured to allow refrigerant to flow to the at least one of the plurality of expansion devices.

2. The heat exchanger of claim 1, wherein each of the plurality of expansion devices includes at least one orifice.

3. The heat exchanger of claim 2, wherein the orifices of the plurality of expansion devices are configured to be positioned inside the header of the heat exchanger.

4. The heat exchanger of claim 2, wherein the orifices of the plurality of expansion devices are off-set from each other in the longitudinal direction inside the header.

5. The heat exchanger of claim 1, wherein the plurality of expansion devices are configured to extend into the header from one end of the header.

6. The heat exchanger of claim 1, wherein the first flow control device is a solenoid valve.

7. The heat exchanger of claim 1, further comprising:
a refrigerant outflow port; and
an outflow control device that is connected to the refrigerant outflow port; wherein the outflow control device has an open state and a closed state, the open state is configured to allow refrigerant to flow out of the header through the refrigerant outflow port, and the closed state is configured to restrict refrigerant from flowing out of the header through the refrigerant outflow port.

8. The heat exchanger of claim 7, wherein the outflow control device is a check valve.

* * * * *